United States Patent
Lin

(10) Patent No.: US 8,746,235 B2
(45) Date of Patent: Jun. 10, 2014

(54) HEAT DRIVEN LIQUID SELF-CIRCULATING DEVICES AND THE SYSTEM EMPLOY SAME

(76) Inventor: Huazi Lin, Richmond (CA)

( * ) Notice: Subject to any disclaimer, the term of this patent is extended or adjusted under 35 U.S.C. 154(b) by 465 days.

(21) Appl. No.: 13/094,616

(22) Filed: Apr. 26, 2011

(65) Prior Publication Data

US 2011/0259321 A1   Oct. 27, 2011

(30) Foreign Application Priority Data

Apr. 26, 2010  (CA) ..................... 2702463
Apr. 26, 2010  (CA) ..................... 2702472

(51) Int. Cl.
  *F24J 3/08*  (2006.01)
(52) U.S. Cl.
  USPC ...... 126/639; 126/642; 126/641; 165/104.22; 165/45; 392/465
(58) Field of Classification Search
  USPC ......... 126/639, 638, 640, 641, 642, 643, 634; 137/124, 134, 87.02; 392/465; 165/104.22, 45, 120, 164
  See application file for complete search history.

(56) References Cited

U.S. PATENT DOCUMENTS

| 4,246,890 A | 1/1981 | Kraus et al. |
| 4,326,499 A * | 4/1982 | Koskela ........................ 126/588 |
| 4,898,152 A | 2/1990 | Kahl |
| 5,441,103 A | 8/1995 | Rezkallah et al. |
| 6,435,420 B1 | 8/2002 | Kasai et al. |
| 7,377,307 B1 | 5/2008 | Ijiri et al. |

FOREIGN PATENT DOCUMENTS

| CA | 0519516 | 12/1955 |
| CA | 2465538 | 5/2003 |
| CA | 2628605 | 11/2009 |
| GB | 0508823 | 7/1939 |
| GB | 0671012 | 4/1952 |
| GB | 2134643 | 8/1984 |
| GB | 2383384 | 6/2003 |
| JP | 2007057165 | 3/2007 |

* cited by examiner

Primary Examiner — Alfred Basichas
(74) Attorney, Agent, or Firm — WPAT, PC; Justin King

(57) ABSTRACT

This application discloses a heat driven liquid self-circulating device, system and method, means the liquid system formed by said devices according to said method can be circulated automatically to transfer the heat without external pump power. The heat driven self-circulating device for heated liquid which used with a liquid heat collector, comprises an airtight container for containing heated liquid, having a wall to separate its outer and inner spaces; said inner space is filled with heated liquid partially and having a upper air/vapor space above liquid level surface and lower liquid space under liquid level surface; a first inlet, a first outlet, a second inlet and a second outlet arranged on said wall of the container that both first inlet and first outlet are under the liquid level surface in said container, and said first inlet not lower than said first outlet.

25 Claims, 15 Drawing Sheets

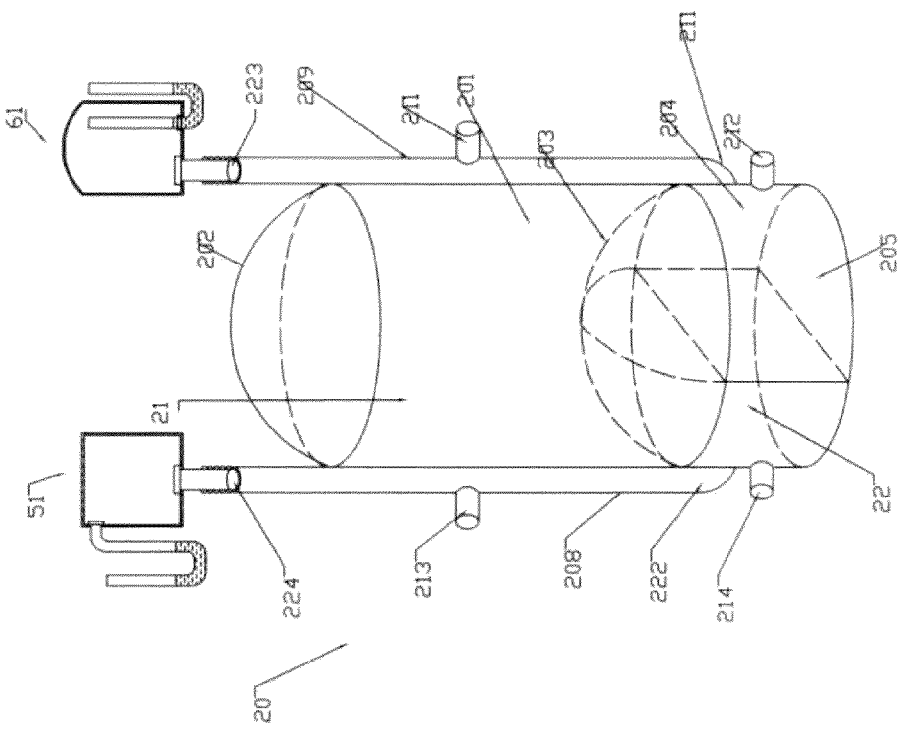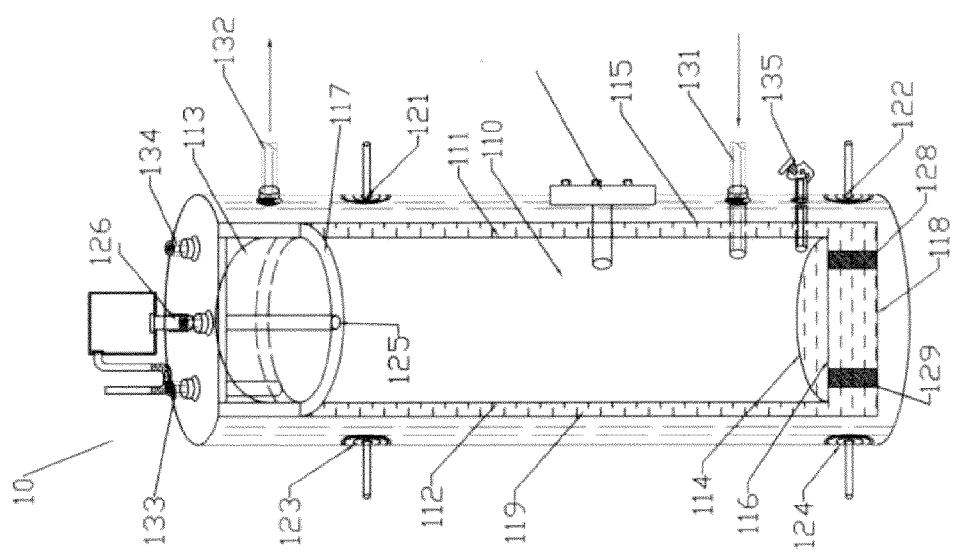

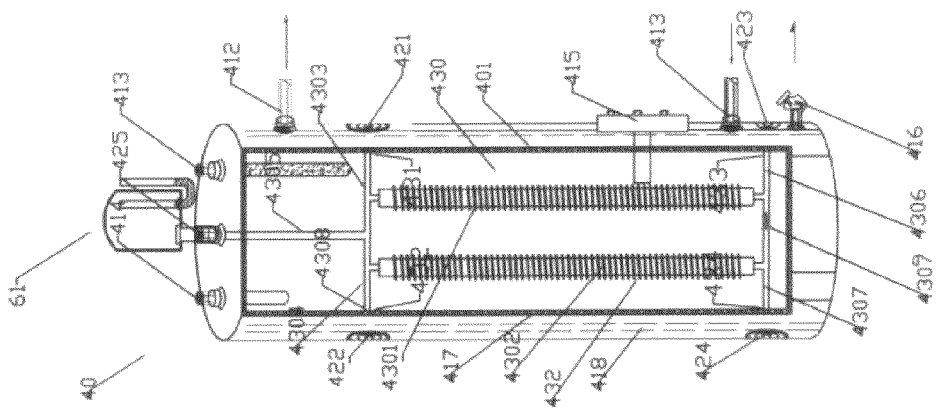
FIG. 2-B
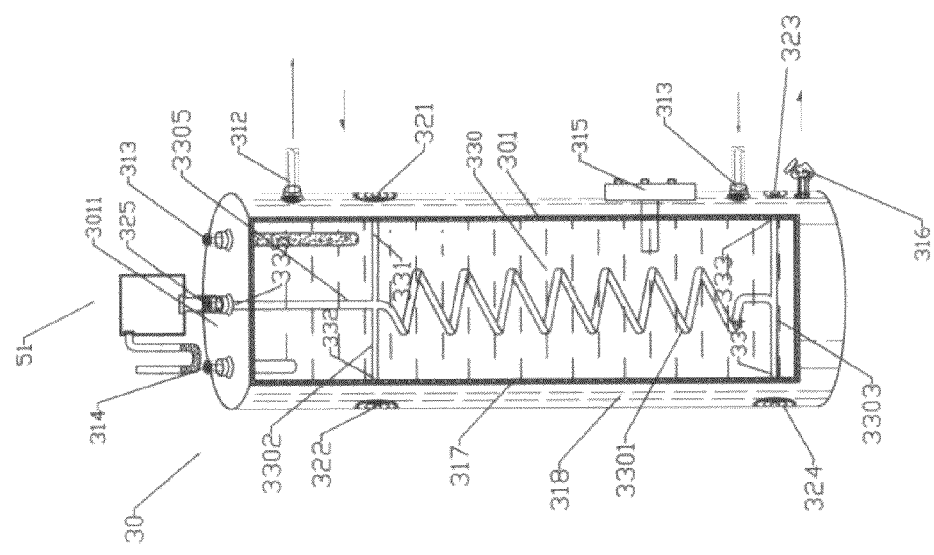
FIG. 1-B

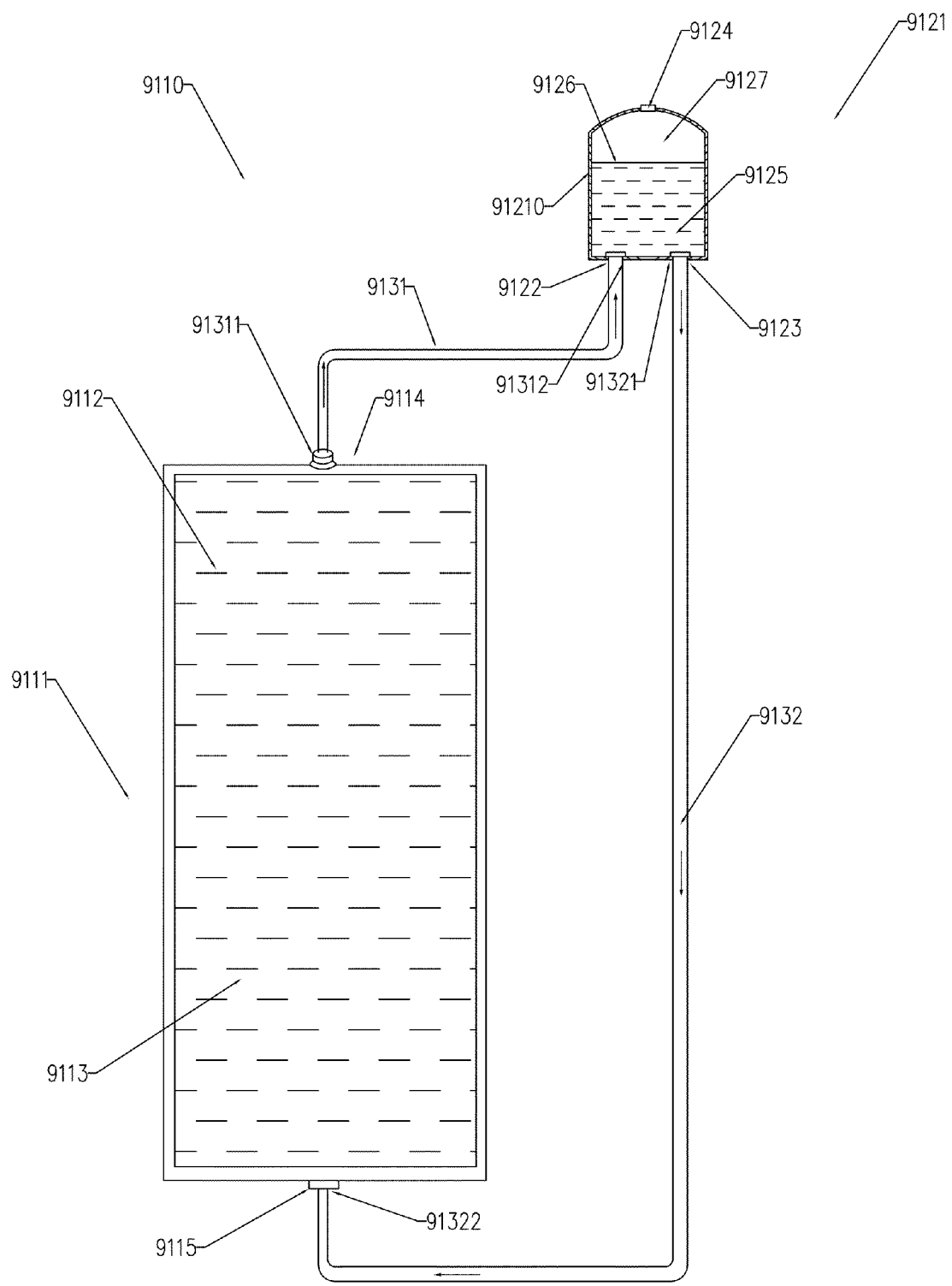
FIG. 1-C

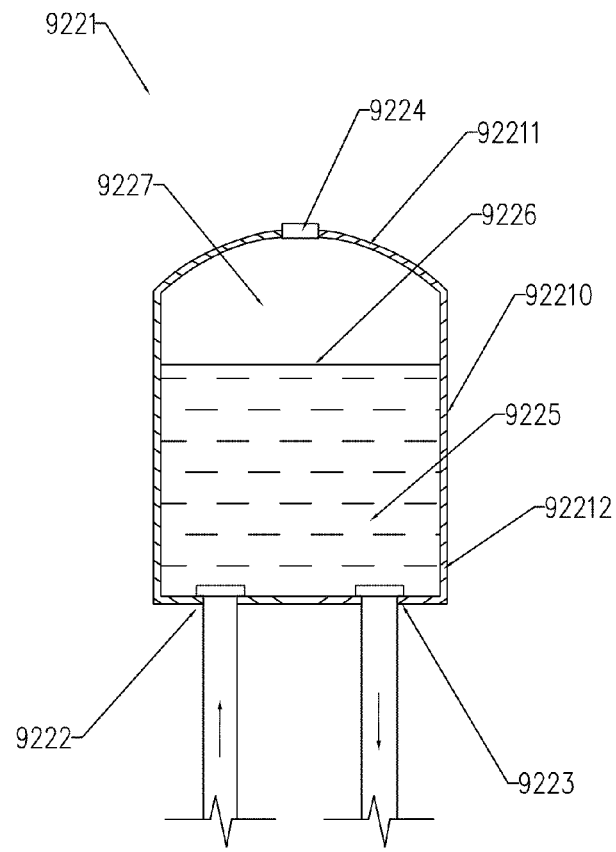
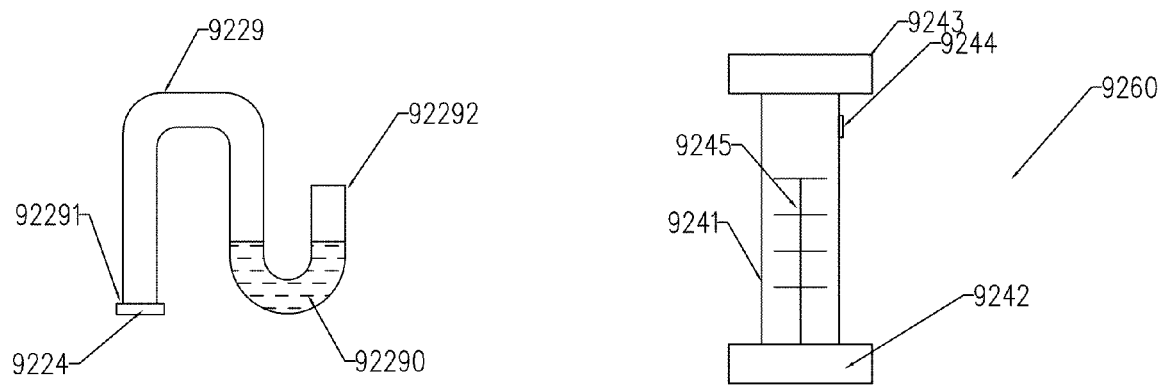
FIG. 2-C

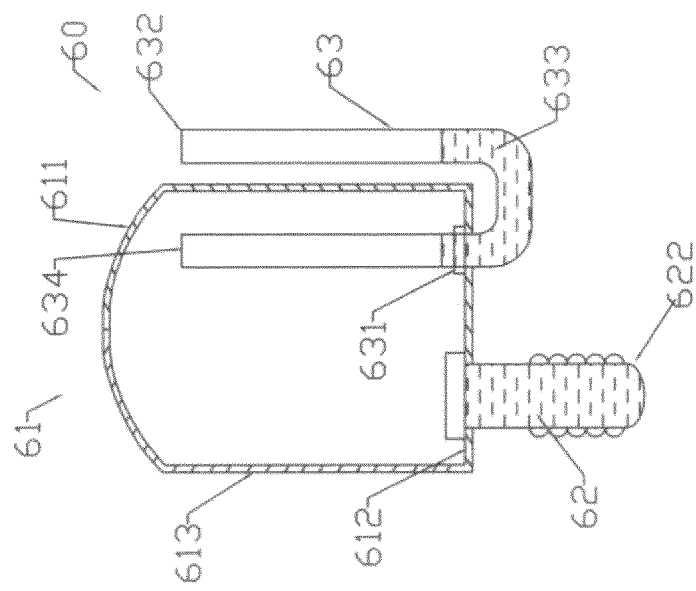
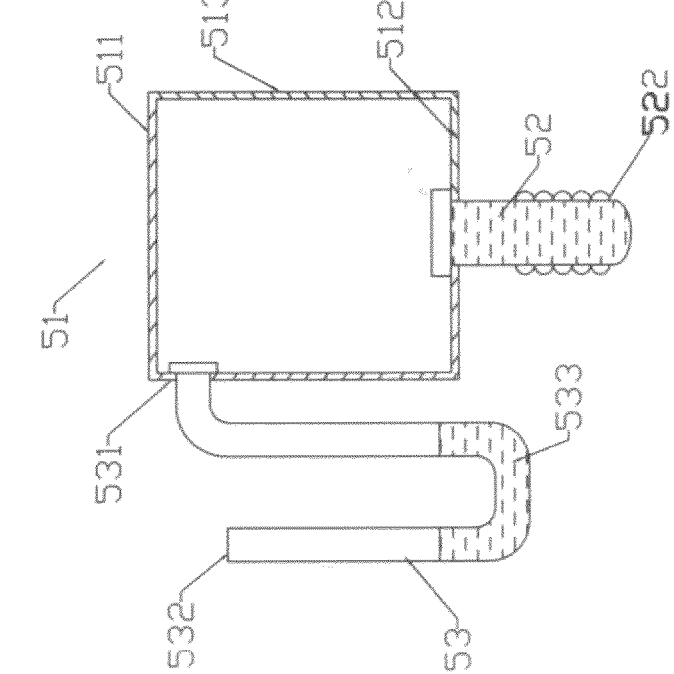

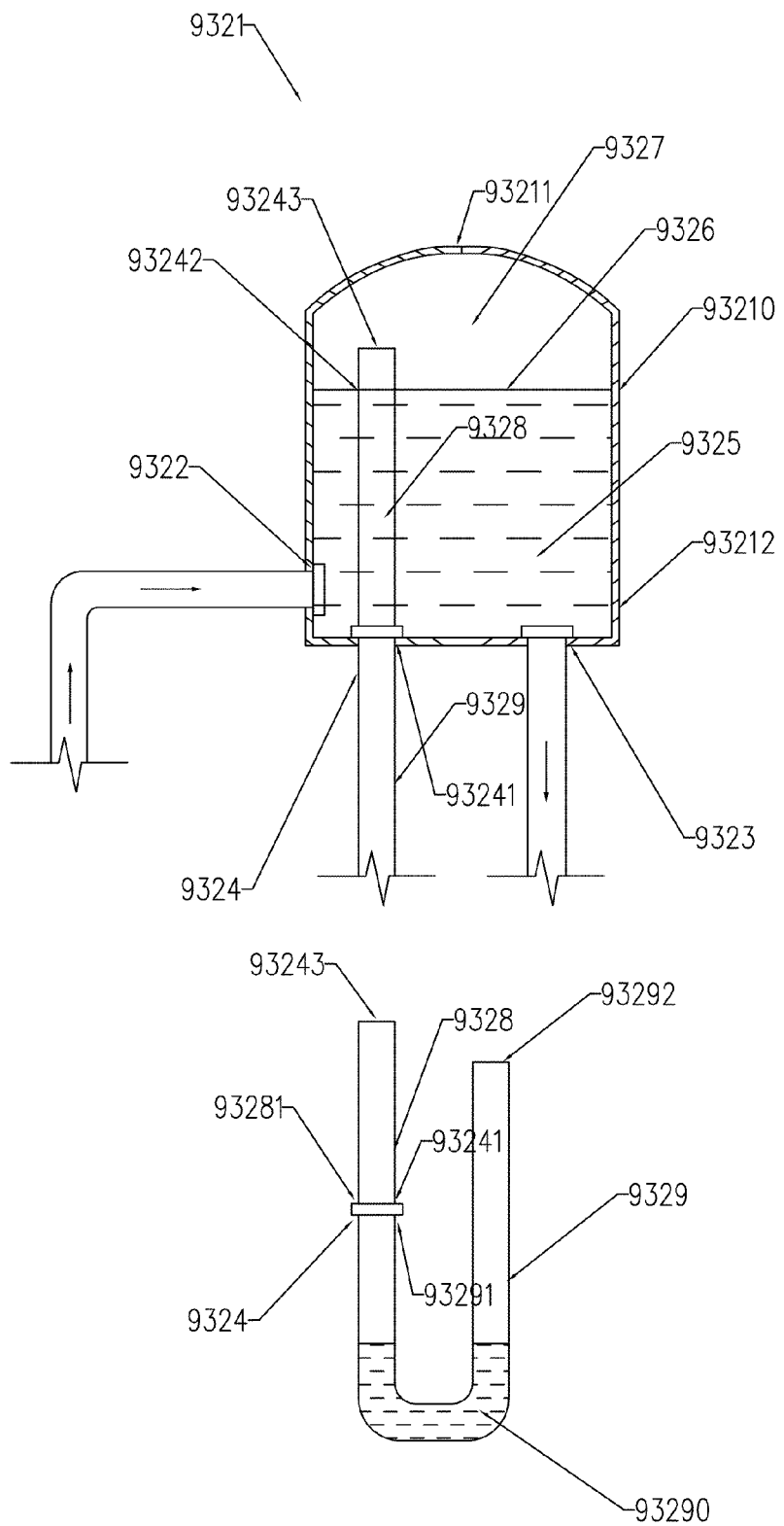
FIG. 3-C

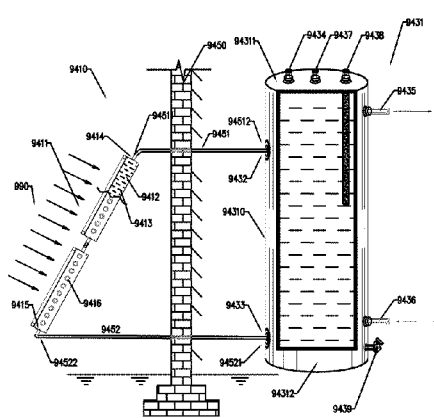
FIG. 4-C
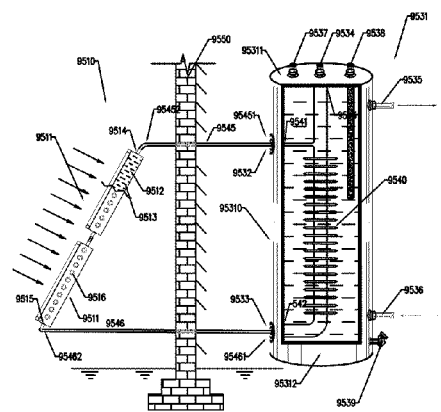
FIG. 5-C

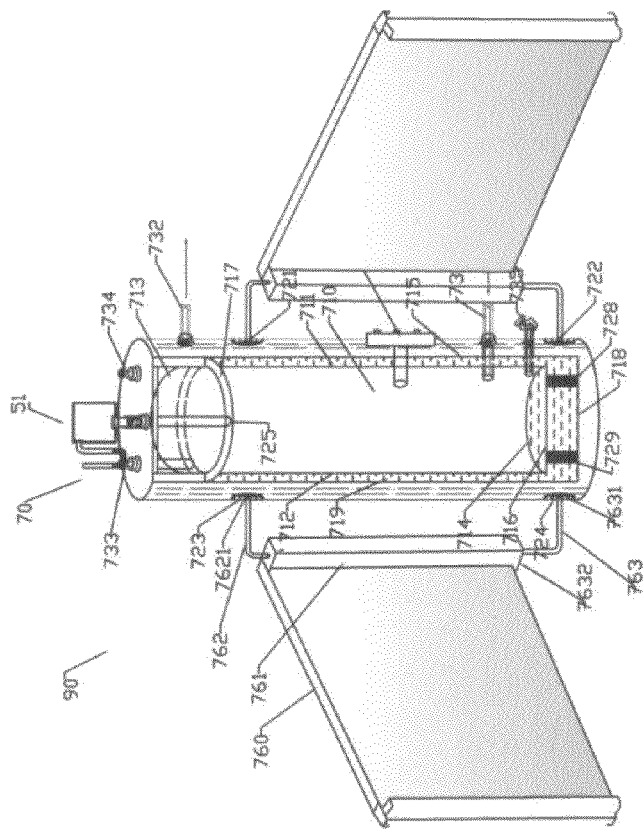
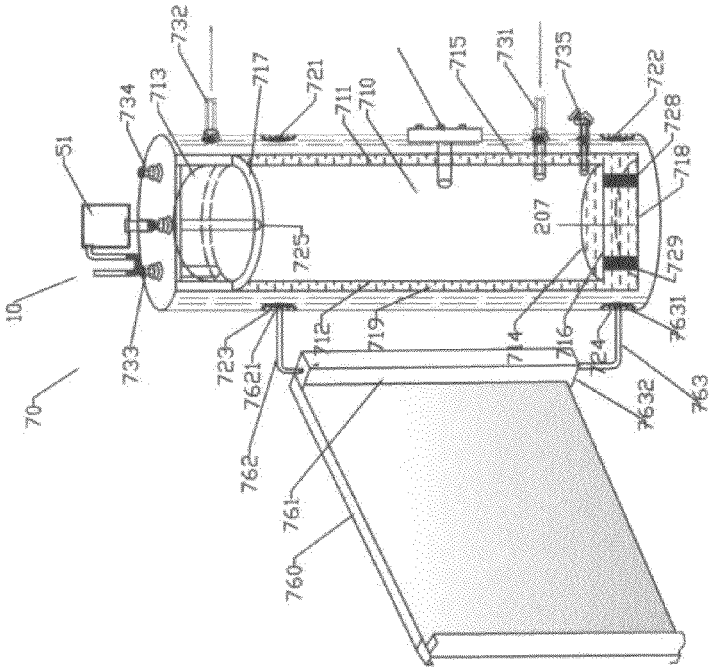

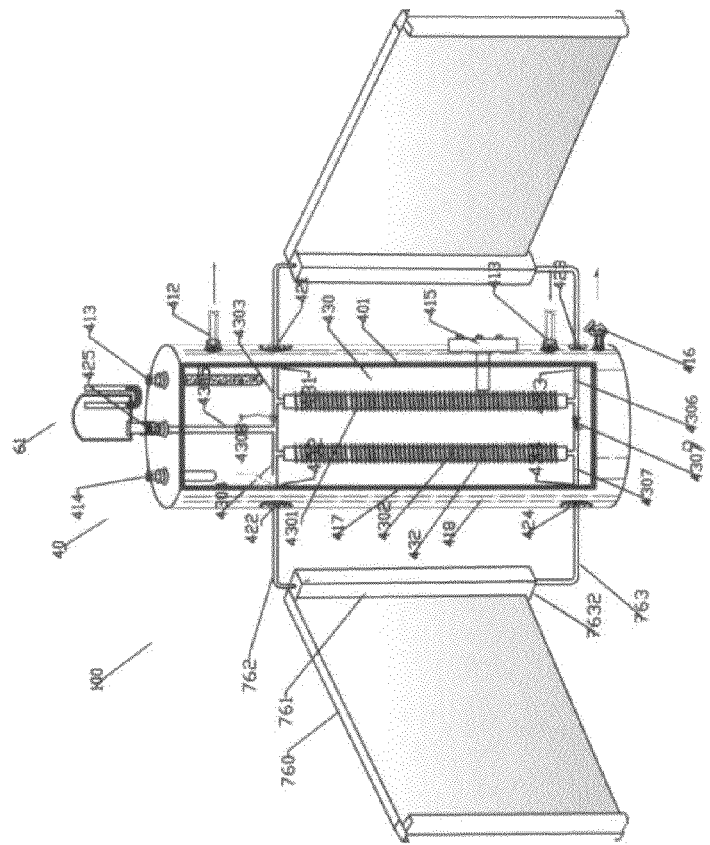
FIG. 5-B
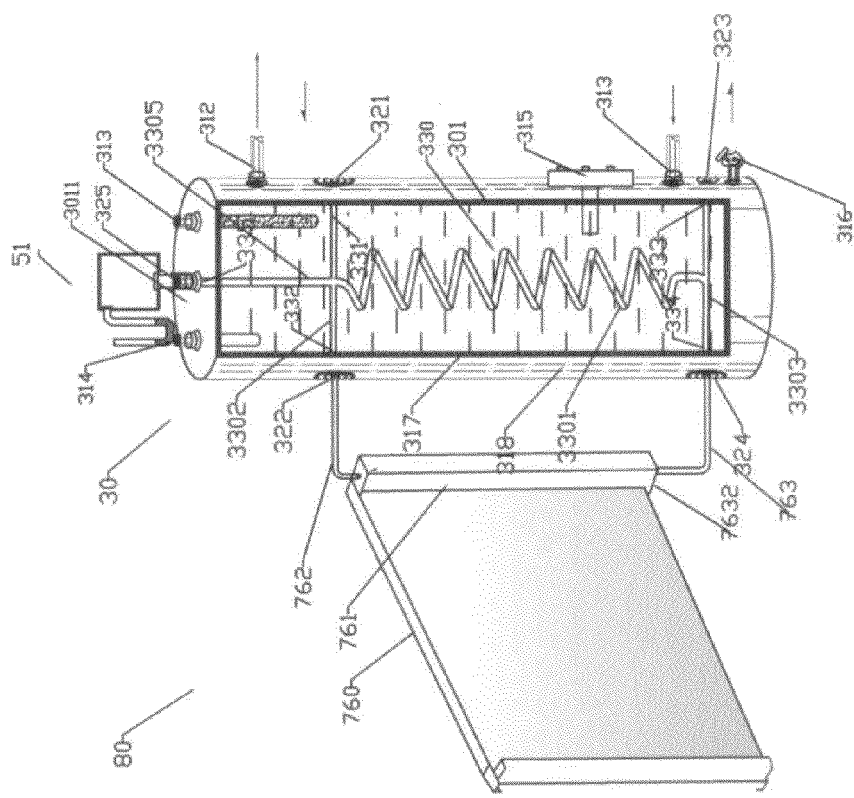
FIG. 6-B

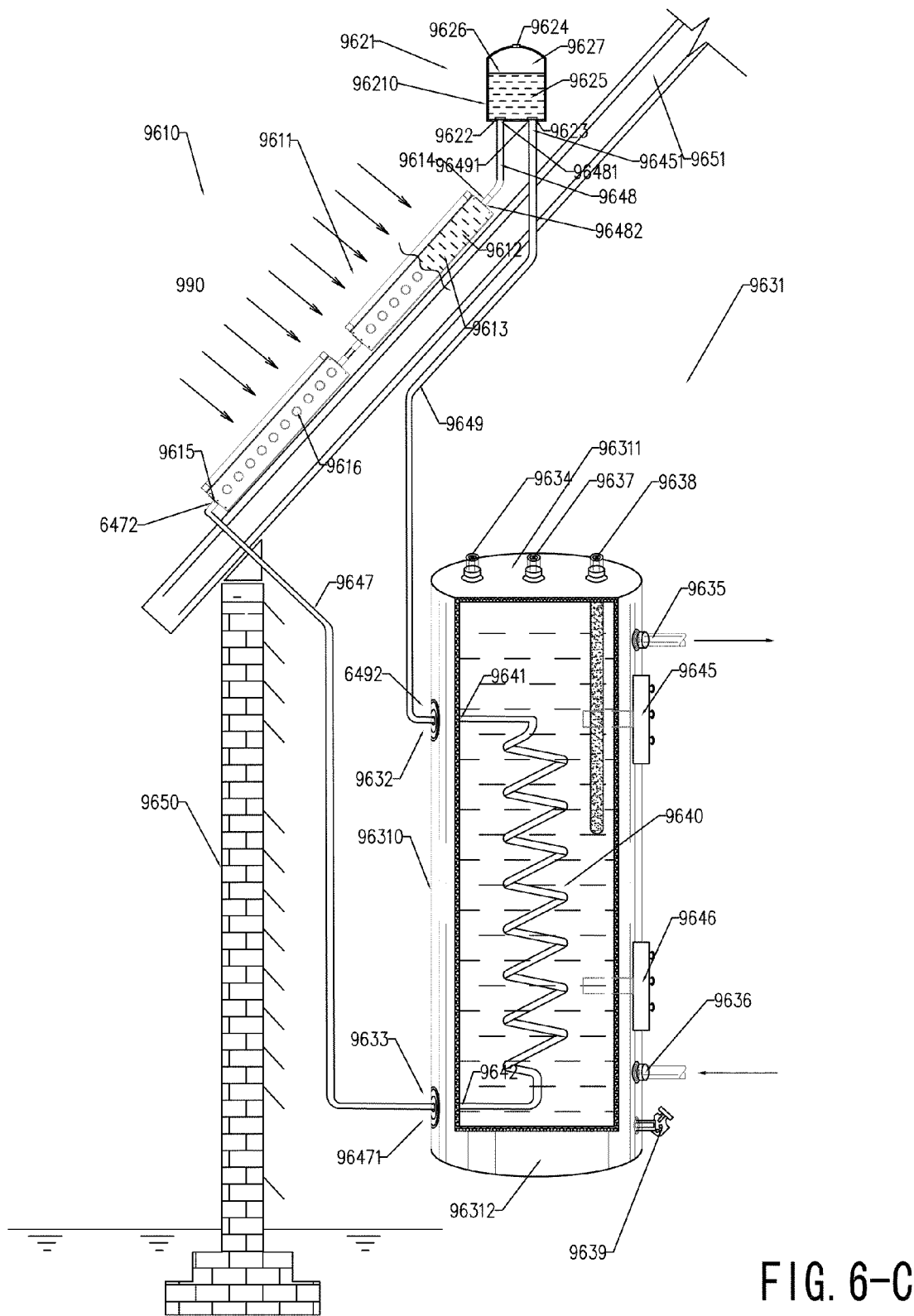
FIG. 6-C

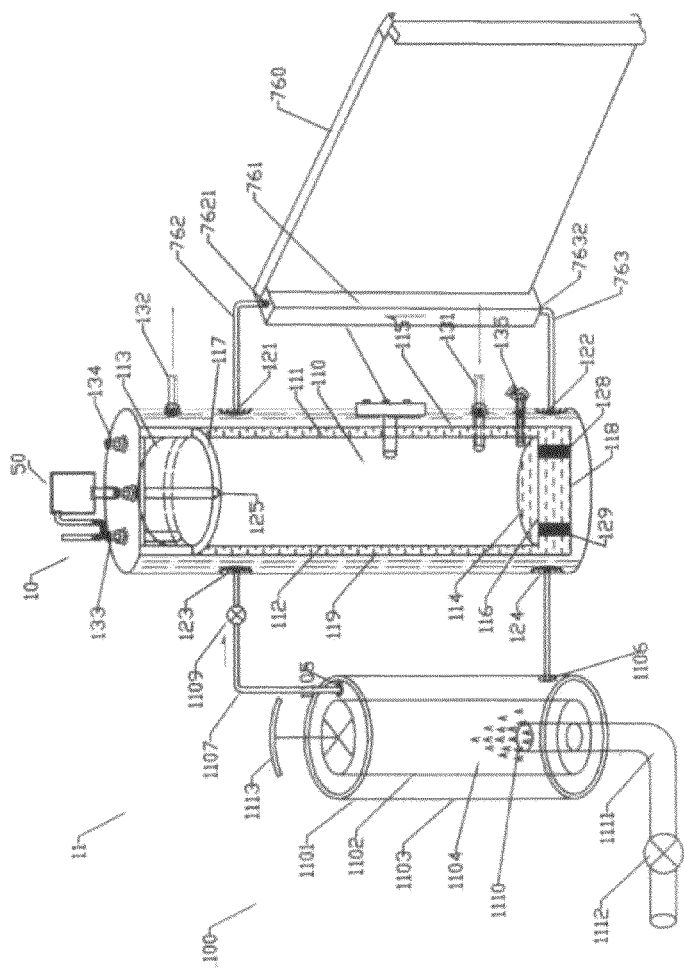

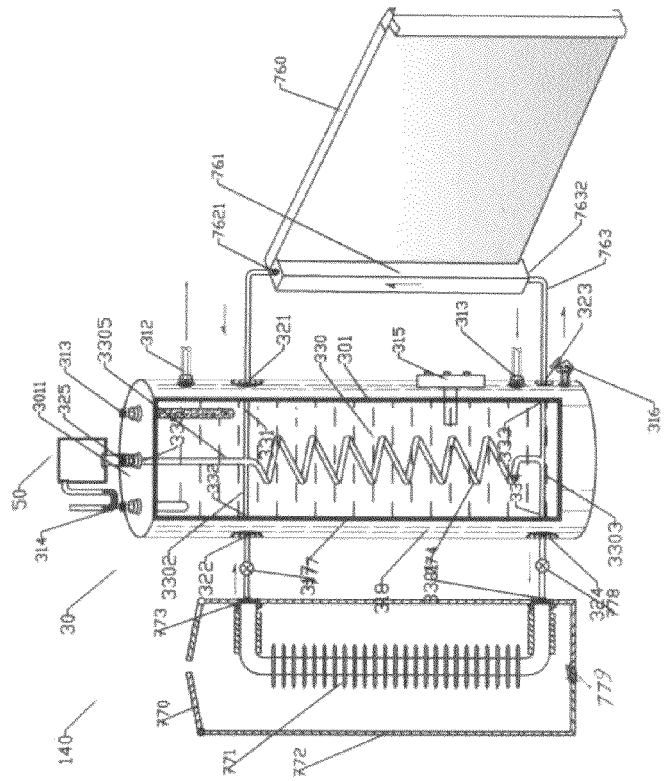
FIG. 7-B
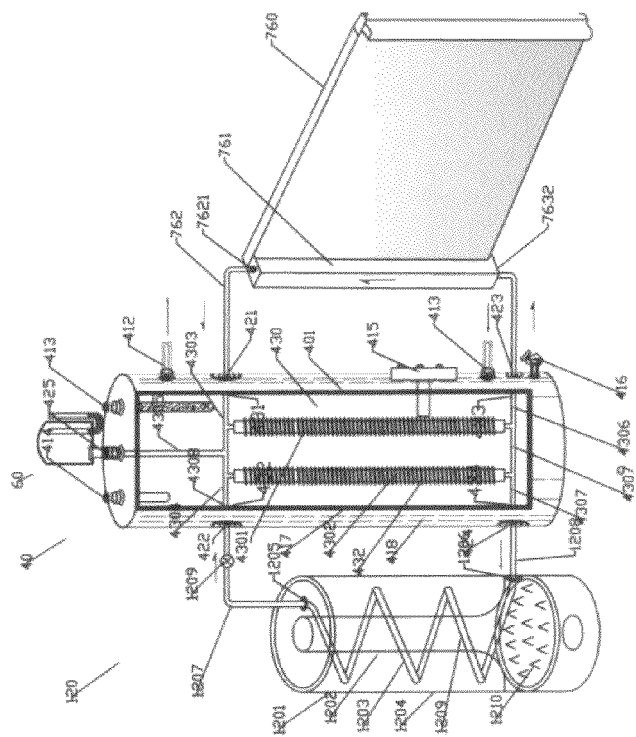
FIG. 8-B

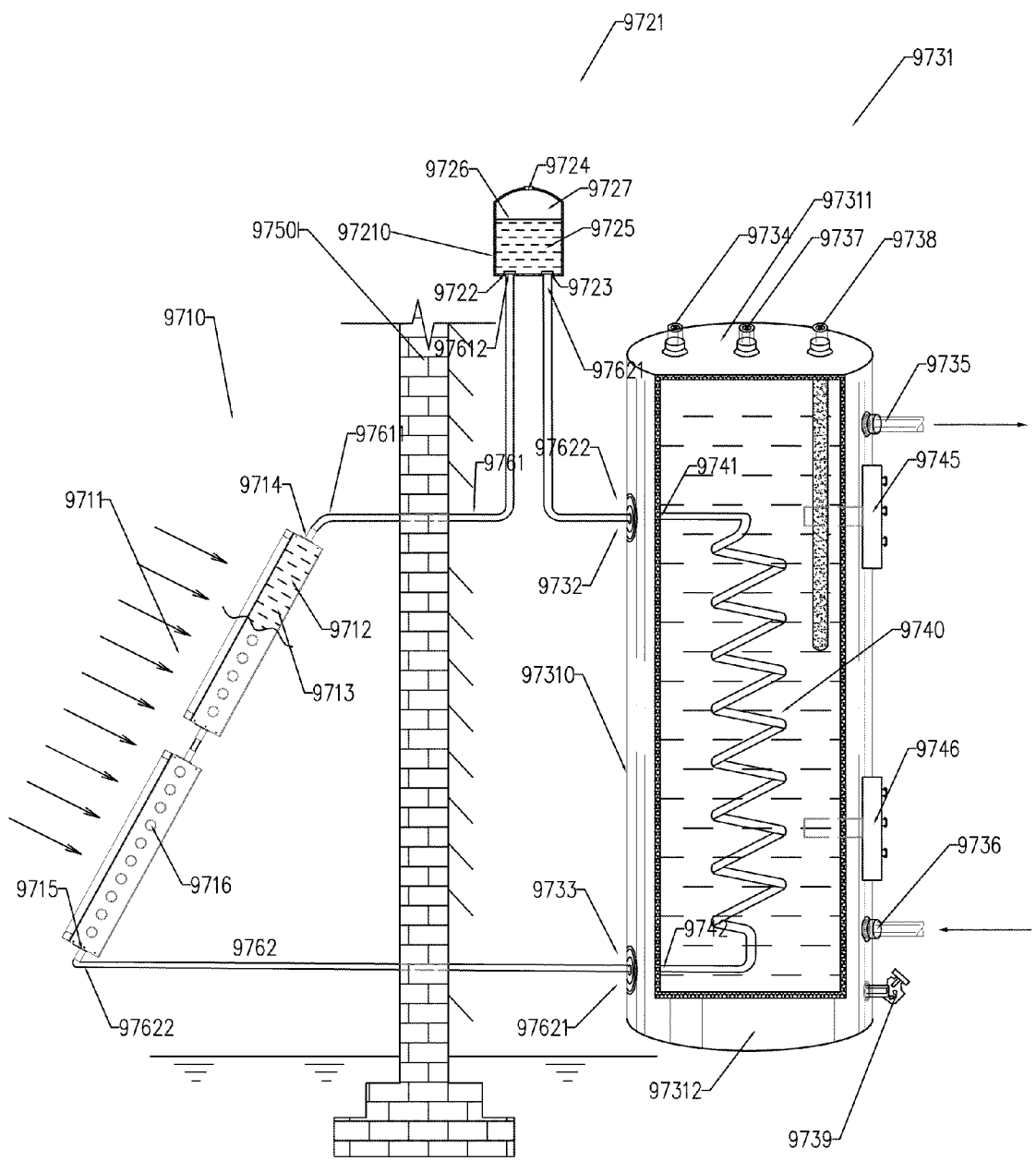
FIG. 7-C

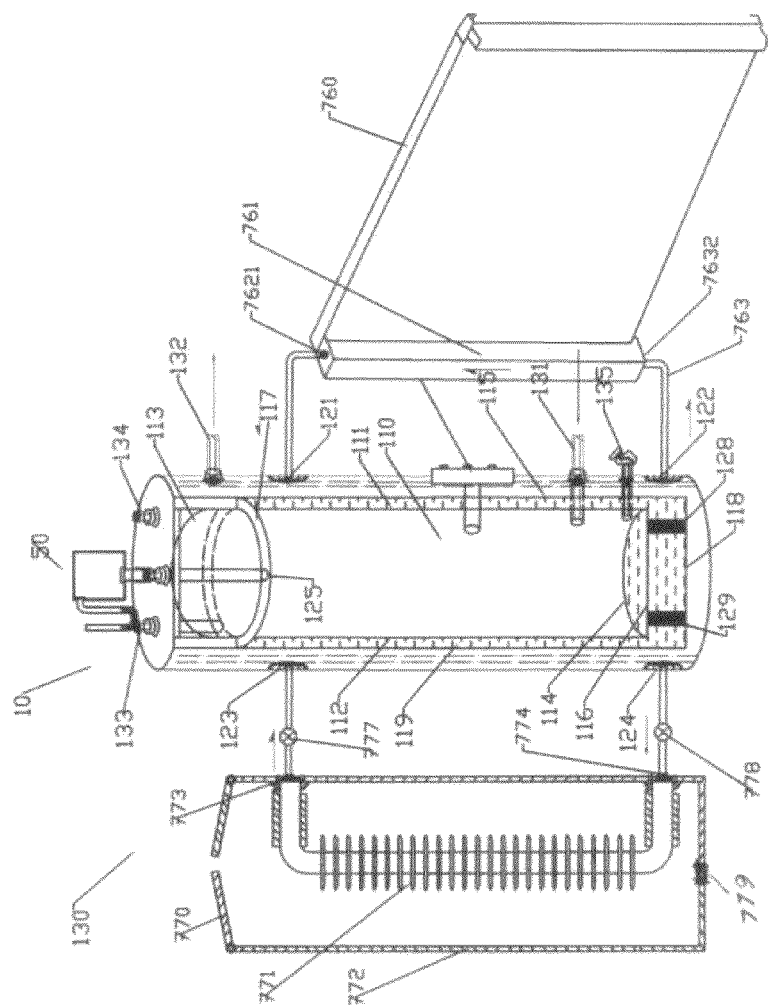

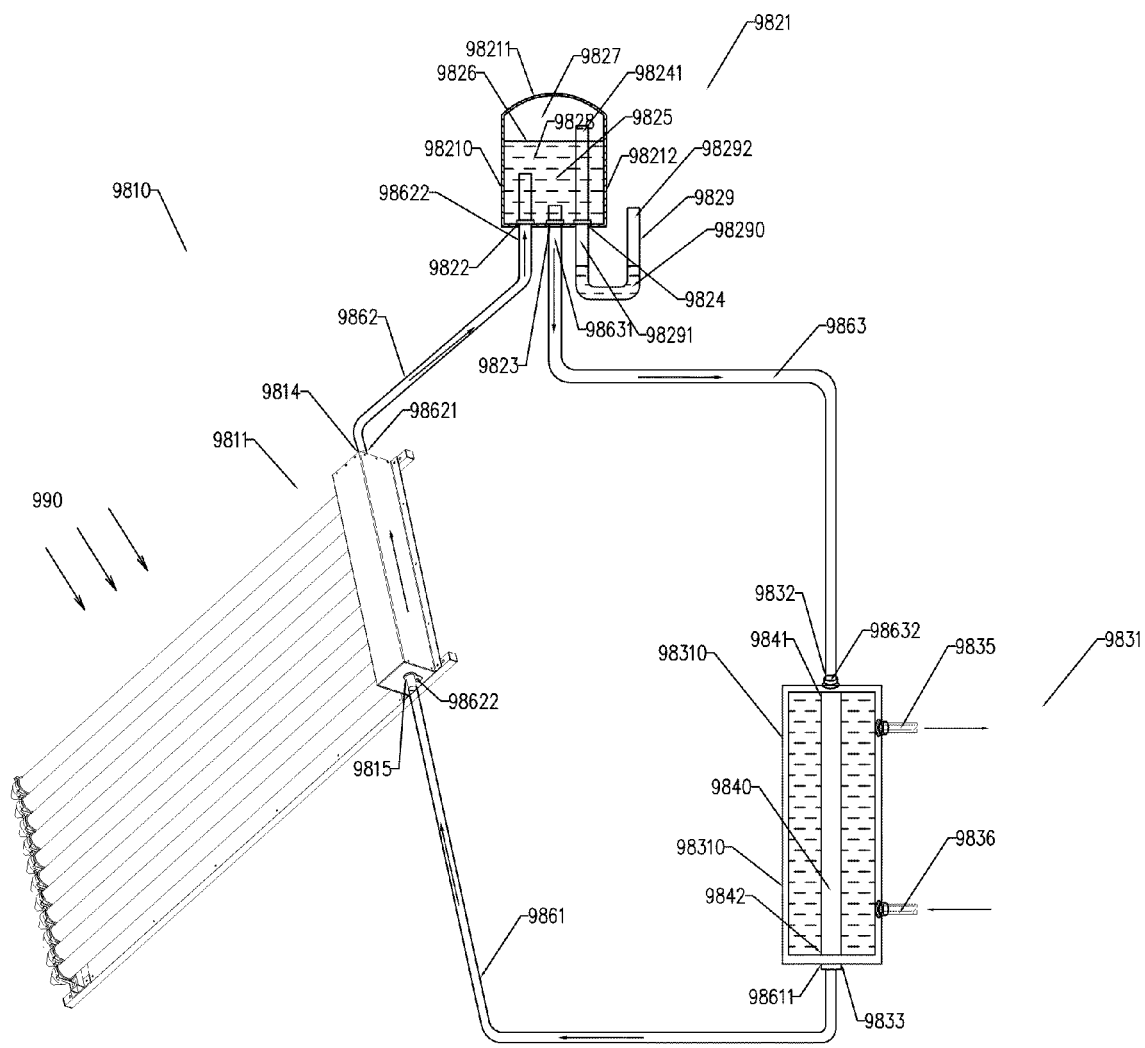
FIG. 8-C

HEAT DRIVEN LIQUID SELF-CIRCULATING DEVICES AND THE SYSTEM EMPLOY SAME

FIELD OF TECHNOLOGY

The present disclosure relates to liquid heating and storing devices and system, especially relates to heat driven liquid self-circulating method, devices and system.

CROSS REFERENCE TO RELATED PATENT APPLICATION

This application is entitled to the benefit of Canadian Patent Application Serial No. 2702463 filed on Apr. 26, 2010 and Canadian Patent Application Serial No. 270472 filed on Apr. 26, 2010.

BACKGROUND OF THE INVENTION

At present the solar heat application is becoming more and more popular. To reduce the costs of hardware, software, installation, operation and maintenance, the inventor disclosed a self-powered pump and the self-circulating systems employ same in a prior patent.

All these systems need a basic equipment—fluid heating and storage tank. The tanks described in above-mentioned patent applications are different in structures. It is not convenient for manufacture and installation. One purpose of this application is to develop tanks for the heat driven self-circulating solar heating and storage systems by standard and modularization manufacture.

Further R&D shows that the concept used in the self-powered pump and its systems can be expended into more generic situations. First, the technology can be used not only for transfer the heat from a higher place to a lower place, but also can transfer the heat to a place at the same level or to a higher place. Second, the self-powered pump not only can used with a tank independently, but also it can be integrated into a tank. In other word, a liquid tank can become a heat driven self-circulating devise.

The solar energy varies in different seasons, locations and weather. Thus the solar energy in the solar heat collected in a solar heating system is not steady. It is expected by solar energy customers that a fluid heating and storage tank can be used not only for solar energy, but also for other energy sources.

Many efforts have been made to integrate the solar heating system with the building in last few decades. The liquid heat driven and self-circulating technology has made the integration of the solar heating system with the buildings much easier. It is the third purpose of this invention to make the solar heating systems an integral structure part of the module units of the building.

The liquid vaporizing and escaping of the heating liquid is a risk for the continue safety operation of a heat driven and self-circulation liquid heating and storage system. Some solutions to solve such problem have been developed in above-mentioned patent applications. This disclosure provides an improved liquid vapor condensing and reclaiming apparatus.

SUMMARY OF THE INVENTION

This application discloses a heat driven liquid self-circulating device, system and method, means the liquid system formed by said devices according to said method can be circulated automatically to transfer the heat without external pump power.

In one aspect, a heat driven self-circulating device for heated liquid which used with a liquid heat collector is disclosed. The heat driven self-circulating device for heated liquid which used with a liquid heat collector, comprises an airtight container for containing heated liquid, having a wall to separate its outer and inner spaces; said inner space is filled with heated liquid partially and having a upper air/vapor space above liquid level surface and lower liquid space under liquid level surface; an inlet and a outlet arranged on said wall of the container that both are under the liquid level surface in said container, and said inlet not lower than said outlet; a breathing channel mounted on said wall of said container for connecting to atmosphere with said inner upper air/vapor space above liquid level surface; said breathing channel having a liquid vapor condensing and reflux structure. The heat driven self-circulating device can be an independent device used with a liquid tank and a heat collector to transfer heat from a higher place to a lower place. The heat driven self-circulating device also can be only a liquid tank itself be used with a heat collector to circulate the heat automatically. The liquid tank can be with or without an interior installed heat exchanger. The liquid tank can also be a two layer tank.

In another aspect, a heat driven self-circulating system is disclosed. The system comprises a heat collector having a liquid vessel filled fully with heat transfer medium, which is a liquid; said liquid vessel having an inlet and an outlet; said outlet is not lower than said inlet, a heat driven self-circulating device for heated liquid, comprises an airtight container for containing heated liquid, having a wall to separate its outer and inner spaces; said inner space is filled with heated liquid partially, which having a upper air/vapor space above liquid level surface and a lower liquid space under liquid level surface; an inlet and a outlet arranged on said wall of the container that both are under the liquid level surface in said container, and said inlet not lower than said outlet; a breathing channel mounted on said wall of said container higher than liquid level surface, which is for connecting atmosphere with said inner upper air/vapor space; a liquid vapor condensing and refluxing structure connects to said breathing channel.

BRIEF DESCRIPTION OF THE DRAWINGS

In the drawings which illustrate exemplary embodiments of this invention:

FIG. 1-A is a schematic diagram illustrating the fluid heating and storage tank with double sidewalls;

FIG. 2-A is a schematic diagram illustrating the fluid heating and storage tank with double bottom walls;

FIG. 1-B is a schematic diagram illustrating the fluid heating and storage tank with an interior-installed coil heat exchanger;

FIG. 2-B is a schematic diagram illustrating the fluid heating and storage tank with an interior-installed double fin tube heat exchanger;

FIG. 3 is a schematic diagram illustrating an apparatus for liquid vapor condensing and reclaiming;

FIG. 4 is a schematic diagram illustrating another kind of apparatus for liquid vapor condensing and reclaiming;

FIG. 5-A is a schematic diagram illustrating the heat driven and self-circulation fluid heating and storage system employing a fluid heating and storage tank with double sidewalls and double bottom walls and one solar heat collector;

FIG. 6-A is a schematic diagram illustrating the heat driven and self-circulation fluid heating and storage system employing a fluid heating and storage tank with double sidewalls and double bottom walls and two solar heat collectors;

FIG. 5-B is a schematic diagram illustrating a heat driven self-circulated fluid heating and storage system employing one solar heat collector and a fluid heating and storage tank with an interior-installed heat exchanger;

FIG. 6-B is a schematic diagram illustrating the heat driven self-circulated fluid heating and storage system employing two solar heat collectors and a fluid heating and storage tank with an interior-installed heat exchanger;

FIG. 7-A is a schematic diagram illustrating the heat driven and self-circulation fluid heating and storage system employing a fluid heating and storage tank with double sidewalls and double bottom walls and two liquid heaters;

FIG. 8-A is a schematic diagram illustrating the heat driven and self-circulation fluid heating and storage system employing a fluid heating and storage tank with double sidewalls and double bottom walls and one solar heat collector and a radiator;

FIG. 7-B is a schematic diagram illustrating the heat driven self-circulated fluid heating and storage system employing a solar heater, a liquid heaters and a fluid heating and storage tank with an interior-installed heat exchanger; and FIG. 8-B is a schematic diagram illustrating the heat driven and self-circulation fluid heating and storage system employing one solar heat collector and a radiator and a fluid heating and storage tank with an interior-installed heat exchanger.

FIG. 1-C is schematic diagram illustrating a simple heat driven liquid close-loop automotive circulation system;

FIG. 2-C is schematic diagram illustrating the self-powered pump of FIG. 1 with a breathing channel at the top of pump;

FIG. 3-C is schematic diagram illustrating the self-powered pump of FIG. 1 with another breathing channel structure;

FIG. 4-C is schematic diagram illustrating a heat driven liquid close-loop automotive circulation system without heat exchanger;

FIG. 5-C is schematic diagram illustrating a heat driven liquid close-loop automotive circulation system with a heat exchanger opened to atmosphere;

FIG. 6-C and FIG. 7-C are schematic diagram illustrating two heat driven liquid close-loop automotive circulation systems when the relevant locations between solar heater collector and heat storage tank;

FIG. 8-C is a schematic diagram illustrating a heat driven liquid close-loop automotive circulation system with a heat exchanger.

DETAILED DESCRIPTION OF PREFERRED EMBODIMENTS

The fluid heating and storage tank 10 in FIG. 1-A is a water tank. It has an interior container 111 comprising sidewall 112, a top cap 113, a bottom cap 114 to form an enclosed space 110 for a first fluid, which is water. The tank has a cold water inlet 131 and a hot water outlet 132, a release valve 133 at the top (it may at the sidewall too), a drain valve 135 and one electric power heater 136. Of cause two electric power heaters can be provided if it is necessary.

A column-shaped (or other shaped) second layer wall 115 is arranged outside of the interior container 111. Its top cap (here is a ring) 117 is mounted at the sidewall of the tank and its bottom 118 is under the bottom edge 116 of the interior container. Such that the container 119 or second space is enclosed by the bottom cap and sidewall 112 of the interior container, outer wall 115, ring 117 and bottom cap 118. The second container is for the second fluid, which is a liquid e.g. water or ethylene glycol etc.

At the second wall the inlets 121 and 123, outlets 122 and 124 are arranged for a secondary fluid. The outlet 122 and 124 are not higher than the outlet 121 and 123 to sure the self-circulating of the heated liquid. At the bottom cap of second wall there are may some struts 128 and 129 are provide to support the interior container for the second wall.

The heat of the container 119 is transferred to the fluid in the interior container 111 through the sidewall 112 and the bottom cap 114. So that the material of the interior-container needs to be a heat conductive material e.g. copper, aluminum, stainless steel or steel plated glass or porcelain enamel.

A breathing channel extends upwardly from the top port 125 and it is connected to the breathing fitting 126 at the top of the tank.

A second fluid vapour condensing and reclaiming apparatus 51 is connected at the fitting 126. It will be illustrated in FIG. 3. In some cases, the breathing channel and the top wall of the tank have enough capability to condense and reclaim the liquid vapour. In these cases the breathing channel having the functions of both the breathing channel and the vapour condensing and reclaiming apparatus. They are 2 in 1.

FIG. 3-A is a schematic diagram illustrating the apparatus 51.

The apparatus 51 is an airtight container. It has a top 511 and a bottom 512 and sidewall 513. An inlet pipe 52 having its one end extending upwardly from the bottom into the container and is mounted to the bottom of the container. In FIG. 3-A, the inlet pipe 52 is a hollow bolt. Its opposite end 522 can be revolved directly into the breathing fitting at the top of the tank.

A flexural U-shaped pipe 53 (it may be many other shape pipes, e.g. W-shaped etc.) extends its one end 531 from the sidewall of the container 51 into the container and under the tope wall 511. Its upper end is spaced from the top wall. The other parts including its lower part of the pipe are located outside of the tank. The pipe extents its opposite end downwardly first and then upwardly. So that the opposite end of pipe 53 is facing upwardly and its lower part 533 is located near to the bottom of the container.

Referring to FIG. 4-A, an alternative fluid vapor condensing and reclaiming apparatus is illustrated. Except U-shaped tube 63, other parts of this second embodiment are similar to apparatus 51 described above. The reference numerals in this drawing are changed from the first digital 5 to 6. Otherwise the construction is similar to apparatus 51 described above.

A U-shaped tube 63 extends upwardly its one end 634 from the bottom 612 of the container 61 into the container and under the top wall 611. There is a gap between the end and the top wall. In FIG. 6, the apparatus provides the breathing for the liquid due to expansion and contraction. A small amount of condensed liquid is retained at the bottom part of the apparatus 61, which prevents further vapor from escaping into the atmosphere through the U-shaped tube 63.

FIG. 4-A is a schematic diagram illustrating another kind of apparatus for liquid vapor condensing and reclaiming. The feature of above mentioned container is to condense the liquid vapor in the container and let the condensed liquid returns to the heater. Usually any inside wall of a container at the temperature less than 100 degree can make the vapor condensing. Usually any metal, e.g. plastic, glass or polymeric material, can be used for making the container. When the system and environment temperature is high, in order to speed up the condensing processing, some condensing pieces may be installed in the container (did not shown in the FIGS. 3-A and 4-A). The flexural pipe 63 also needs to make the vapor condense in the tube. Furthermore, at the U shaped lower part of the pipe a few condensed liquid can be stored temporary to block the escaping of the escaped vapor. The flexural pipe can be made of many different materials e.g. glass, metal, plastic, polymeric material etc. The shapes of the pipe are flexible, e.g. U shaped, W shaped or the like in which the bottom part of the pipe can store some condensed liquid. Transparent pipes may be used to provide visible monitoring of the condensed liquid.

One of the main concerns for an operating heat driven self-circulating fluid heating and storage tank e.g. solar heating system is the fluid vaporizing and the vapor escaping through the breathing port. It may result a fail of the system operation. The application of the above introduced apparatus for fluid condensing and reclaiming resolves this problem completely. Usually the container of the apparatus are made of transparency materials, e.g. transparent glass, plastic or polymeric materials, thus the liquid level of the heat exchanger can be visually monitored, and the more liquid can be added through the breathing port if it is necessary.

When the position of the secondary bottom wall is moved upwardly until it is connecting to the edge of the first bottom wall, the tank becomes a fluid heating and storage tank with double sidewalls. FIG. 5-A also illustrates the operation situation of a tank with double side walls but without double bottom wall.

There are two spare bolt caps for closing the unused inlet and outlet and one spare bolt cap for closing the unused breathing fitting. If necessary, all the breathing ports can be closed. In this case, the tank can be used as a regular tank with heat exchanger or used with self-power pump or electric pump.

FIG. 2-A is schematic diagram illustrating the fluid heating and storage tank with double bottom walls, which is a columned water tank 20. The columned sidewall 201, coronary top cap 202 and bottom cap 203 form a closed space 21 for primary fluid, which can be water. The sidewall 201 extends from the bottom edge 206 and forms a new extended sidewall 204. The sidewall 204 together with the first bottom wall 203 and the second bottom wall 205 enclose a second space 22 for the secondary fluid which can be water or a antifreeze e.g. glycol etc. On the sidewall 201 of the tank, there are two pipes 208 and 209 arranged in 180° relative to one another. Their lower ends 221 and 222 extended respectively through the sidewall and into the second space 22. The other ends 223 and 224 extended upwardly around the sidewall and are connected to a three-way pipe joint. The upper end of the three-way pipe extends to the top of the tank. The third port of the three-way pipe is for connecting to the heater of secondary fluid. The two tubes 208 and 209 may be other kinds of channels. For example they may be two slots to cling at the surface of the sidewall. One end of these tubes extends into the second space and the opposite end extends to the top of the tank. For the rust protection purpose, the inside of the channels need to plat glass or porcelain enamel. Alternatively, the tubes or channels may be arranged inside of the tanks. The ends of the pipes or channels also may be located at some locations under the top of the tank. The angle of the two pipes 208 and 209 on the sidewall of the tank may also be located at 90 degrees or other selected angles.

At the sidewall near the bottom, the outlets 212 and 214 of the secondary fluid are arranged. FIG. 5-A also shows that the second space of the tank is separated into two left and right sub-spaces by a clapboard 207. The liquids in these two sub-spaces are isolated. There are two separated sub-liquid systems in the second space. This kind of system is used for two kinds of heaters in the two sides of the tank. Especially it is used for the system wherein one heater requires the forced circulating. For example, first heater is a solar heater and second heater is another energy heater which needs a forced circulating, e.g. earth energy or air energy. For using some other energy source, e.g. biomes energy, gas energy and fossil fuel energy, if there is no need of a forced circulation, the secondary liquid system may either separated or not separated. Correspondingly the breathing ports 223 and 224 can be connected to the atmosphere by two ports or either one (e.g. 224) of two ports, when the other port is closed by a spare cap.

When the two heaters connected to the tank are both solar heat collector, the clapboard in the second space of water tank may not necessary. Then the top ends of two pipes are opened.

It can be understood by those skilled in the art that many common elements, for example, release valve, drain valve, protective anode and one or two electric heater(s) etc may also provided in the tank. Furthermore, a heat insulation layer and a crust outside of the tank wall may be provided. All of these elements are shown in FIG. 1-A. Please refer to FIG. 1.

FIG. 6-A is a schematic diagram illustrating the heat driven and self-circulation fluid heating and storage system employing a fluid heating and storage tank with double sidewalls and double bottom walls and two solar heat collectors. Even both solar heat collectors in FIG. 6-A are plate solar heat collectors. But each of them can be any kind of the solar heat collector, for example, the plate solar heat collector (with or without the heat tube), Vacuumed tube solar heat collector (with or without the heat tube) and U-shaped solar heat collector etc.

The solar heat collector 760 in FIG. 6-A has a secondary fluid inlet 7611 and outlet 7612. The first conduit 762 is connected its one end to inlet 422 of the tank and an opposite end to the outlet 7611 of the solar heat collector 761. The one end of second conduit 763 is connected to the outlet of the tank and the opposite end 7632 to the inlet of solar heat collector 760. The second solar heat collector 780 has similar connection arrangement.

Based on the application requirement, two couple inlet and outlet, 721/722 and 723/724 may be arranged at the sidewall in any angle from 90-180 degrees. When the heat driven self-circulated liquid heating system is used as building elements, for example as a unit element of the roof, fence, veranda etc, the units with two solar heat collectors arranged in 180 degrees are the plane unit of building walls, fences and verandas. The units with two solar heat collectors arranged in less than 180 degrees are the corner units.

As a building component unit, the heat driven and self-circulating solar heating and storage system should be and can be a compacted component. In FIG. 6-A, when the solar heat collectors are moved close to the fluid heating and storage tank and make the solar heat collector's sizes larger, a compacted solar heating and storage system will be find.

Similar to those shown in FIG. 5-A, each of the two couple of inlet/outlet ports is in a plumb line. However, the angle of the solar heat collector may be oriented to an obliquity (i.e. not 90 degrees) angle to the surface of the earth. Even if the inlet and out ports are in a plumb line, we still can adjust the arrangement of connecting conduits 762, 763,782 and 783 to let the solar heat collector to be at an obliquity angle (not 90 degrees) to the surface of the earth for receiving a point-black amount of sun light. It is also possible to arrange the entire unit of the solar heat collector and the tank to stay at an oblique angle to the earth. In this case the tank is catty-cornered. To protect the fall, the support of the system needs a special design.

After installation, the heat driven self-circulating solar heating and storage system 90 comes into being two fluidly separated but heat connected liquid spaces. The first space is the interior container of tank 70 which may be filled with the liquid to be heated e.g. water, air or other fluids. The second space is formed by the interlayer 719, two conflux tubes of the two solar heat collectors, connecting conduits and the inner space of the apparatus for fluid condensing and reclaiming 51. This close-loop system connects to the atmosphere indirectly through the U-shaped tube 63. After the system is installed, the system will be filled with the heat conductive liquid, e.g. water or glycol. The liquid level in the tank will be lower than the breathing fitting.

When the sunlight irradiation heats the liquid in the solar heat collectors 760 and 780, the liquid in the conflux tubes 761 and 781 (within the heat insulation which is not shown in the Figure) is heated and tends to flow upwardly. The heated liquid flows through the connecting conduit 762 into the interlayer 719, and the heated liquid transfers its heat to the liquid in the tank through the sidewall and bottom wall of the interior container. Then the liquid temperature drops and the volume of the liquid also drops too. Through the outlet 724 and the conduit pipe 763, the cooled liquid flows back into solar heat collector 760 again for being heated. This processing continues in circles to heat the water in the tank by the solar heater. In this process, the solar heat is the only energy source to drive the circulating liquid and to complete the energy exchange. Therefore, no other energy source, e.g. electric power, is required except the solar heat. In this process, when the sunlight is stronger, the heat circulation will be faster, whereas the heat circulating is slower, when the sunlight is weaker. When there is no sunlight, the heat circulating will terminate completely. It is not necessary to provide additional controller for controlling the liquid circulation. This head driven system has the functions of self-driven, self-control and self-circulating.

When the system is in operation, the breathing port 725 serves several important functions. First it releases the pressure in the system caused by the heated liquid expansion for keeping the system pressure closes to the atmospheric pressure. It also provides a space for the liquid's breathing (namely, expansion and contraction) so as to facilitate the self-circulating operation. When the heater is in operation, the heated liquid causes some liquid and vapor to flow into the container 51. The part of the vapor is cooled and condensed in the container 51, and then is returned to the heat exchanger. Some vapor may escape into the U-Shaped tube and then change into liquid, which will stay in the lower part of the tube. The gathered liquid in the tube blocks the further escape of vapor and would enhance further vapor to condense in the tube. When the heater stops working, the liquid in the container 51 and interlayer 719 cools down and contracts, so that the system generates a negative pressure to reclaim all the liquid gathered in the U-shaped tube to be drawn back into the heat exchanger. Even though the space storing the heat liquid is connected to the atmosphere directly or indirectly, the system working temperature is high, but the loss of the secondary liquid through vaporizing is not significant. Accordingly the system operates continuously and safely.

For the space or other reasons, sometimes the solar heating system may be equipped with single solar heat collector only. In this case, the solar heat collector 780 may be removed and the spare inlet and outlet ports 421 and 423 are closed as shown in FIG. 5-A. In another alternative, we can also replace the single solar heat collector by another type of heater operated with another energy source.

Based on the above-mentioned description, the tank in FIG. 5-A and FIG. 6-A can be replaced by a tank with double layers of sidewalls or double layers of bottom walls.

FIG. 7-A illustrates a heat driven self-circulating liquid heating and storage system 11 using a tank 10 with double layer sidewalls and bottom walls. Comparing to FIG. 5-A, a solar hear collector 760 and a other energy source heater. The system illustrated shows a nature gas heater.

The tank 10, solar heat collector 760 and the connections between it and the tank are the same as shown in FIG. 6-A. Here the nature gas heater 1100 is a central vacant cylinder (or other shaped e.g. taper, square etc) metal (or ceramic etc) tank. There is a second liquid inlet 1106 provided at the bottom wall and a conduit connects the inlet with an outlet 124. At the upper (or top) sidewall there is a secondary fluid outlet 1105, which is connected to an inlet 123 of the tank through conduit 1107. A valve 1109 mounted in series to the tube 1107 is operative for turning off the gas supply when the heater is out of service. A similar valve may also be connected to the bottom conduit for the same purpose. The cover 1113 is for sheltering from the spark occurring in the heater.

The gas heater 1100 has a outer wall 1101 and a interior 1102 and heat insulation 1103 (not show in the figure). The secondary fluid is stored in the space enclosed by interior and outer walls, top and bottoms caps. The interior chamber 1104 has a gas burner 1110 which is supplied the gas by gas pipe 1111. There is a control valve 1112 for adjusting the gas supply.

When the system is in operation, the nature gas burns in the chamber 1104 of the heater to heat the inside wall 1102, thus the liquid, of the heater 1100 (there may be protective coat for heat insulation and corrosion protection). The heated liquid passes through the outlet 1105 and conduit 1107 to reach in the interlayer 119 of the tank. After the secondary liquid has transferred the heat to the water in the tank, the secondary liquid returns to the heater 1100 through the outlet of the tank. This processing is similar to the solar heat collector.

For a heat driven self-circulating fluid heating and storage system with a solar heat collector and another heater having another energy source, its operation is similar to that mentioned in the system with two solar heat collectors.

Even though the second heater shown in FIG. 7 is a nature gas heater, it can also be any alternative kind of non-solar heaters, e.g. fossil fuel (e.g. coal) heater, biomass energy heater, (including biomass gasification heater), nature gas, earth energy, and air energy heater. The difference of this kind of the liquid heater is that the heating liquid storage space of this kind of heater is much smaller than any other kind of liquid heater. For example, one metal tube can be the storage container of the liquid to be heated in the heater. For the reason such as heat insulation and corrosion protection e.g. a firebrick or a ceramic protective layer may be provided. Further more, this heater can be a heater of earth or air heat energy. Because these kinds of the heaters usually need the forced circulation, so the heaters need a separator (e.g. separator 207 in FIG. 2-A) to separate the liquid into two sub-systems. In this case, only the sub-system connected to the solar heat collector has a breathing port. Another sub-system either has no breathing port or the port is closed with a spare cap.

FIG. 8-A illustrates the heat driven self-circulating fluid heating and storage system 130 with a heat appliance (here is a radiator). The system includes a solar heater 760, a radiator and a liquid heating and storage tank 10 with double sidewalls and double bottom walls. In FIG. 8-A, the tank 10 and radiator and their connections are same as the embodiment shown in FIG. 7-A. The radiator includes a fin pipe 771 (it also can be a coil tube, helix tube, straight tube or a flat heat exchanger etc). Two pipes connect inlet 773 and outlet 774 of the radiator to the inlet 123 and the outlet 124 of the tank respectively. Two valves 777 and 778 are for separating the radiator with the tank when necessary.

Solar heat collector 760 receives solar energy and transfers it to the tank 10, so the temperature in the tank is higher than the temperature of the surrounding air. When heated air is required, the valve 777 and 778 of the tank are opened, so that the hot water circulates into valve 777 and go through fin tube 771 to emit warm air there from. After the emission of warm air, the cold water then goes through valve 778 to returns to the bottom of the tank 10. In order to increase the amount of heated air generating and to send the air to a planned direction, a cover 772 with an active window 770 may be provided. (as shown in the FIG. 8, the window is opened upwardly. The cover 772 has an inlet 779 for the air to be heated. In fact the direction of the window can be varied. One or more fans may be provided in the cover to speed up the heat pervasion from the fin tube. (the fans did not show in the figure). If a canal is added to the window of cover 772, the heated air can be transferred to a desire location (the canal did not show in the figure).

It can be note that the fitting 123 of the tank is an inlet when it is connected to a heater, but when it is connected to a radiator, it becomes an outlet, while the fitting 124 is an outlet when it is connected to a heater, but it becomes an inlet when it is connected to a radiator.

It is also possible to install the radiator or other heat appliances in a heat driven and self-circulating system with two solar heat collectors or with one solar hear and one other heat source. In this case, the fluid heating and storage tank need three couple inlets and outlets.

While the present invention has been shown and described in the preferred embodiments thereof, it will be apparent that various modifications can be made therein without departing from the spirit or essential attributes thereof, and it is desired therefore that only such limitations be placed thereon as are imposed by the appended claims.

FIG. 1-B illustrates a fluid heating and storage tank, which is a hot water tank 30. The tank has a container 301 for storing water. There is an inlet 313 for cold water and an outlet 312 for hot water. On the top wall, there is a protective anode 319 and a release valve 314. At the side wall there is a drain valve 316 and electric heater 315. Outside of the container there are the heat insulation 317 and a crust 318.

At the wall 301 of the tank 30, there are two inlet fittings 321 and 322 and two outlet fittings 323 and 324 are also arranged. Further there is a breathing port 325 at the top of the tank.

A heat exchanger 330 is disposed within the fluid heating and storage tank 30 for flowing secondary fluid, which is a liquid through the storage tank in isolation from the water. The heat exchanger has first inlet 3210, first outlet 3230, second inlet 3220 and second outlet 3240 for secondary fluid and at least one breathing port 3250. Each port of inlets, outlets and breathing ports are mounted on one of the corresponding connecting fitting, i.e. 321/3210, 322/3220, 323/3230/324/3240 and 325/3250 respectively. The two secondary fluid inlets 321 and 322 are located higher than the two outlets 323 and 324. The breathing fitting is located not lower than said inlet fittings.

The heat exchanger 330 is combined with a coil tube 3301 and some straight tubes. The coil tube can be a fin tube, a helix tube, or a straight tube. The heat exchanger also can be a flat plate heat exchanger having square shape or ellipse shape, etc. The key point is that two inlets 3210 and 3220 connect (or mounted) to the corresponding inlet fitting 321 and 322 respectively, other two outlets 3230 and 3240 connect (or mounted) to the corresponding outlet fittings 323 and 324. One breathing port 3250 connects (mounts) to the corresponding breathing fitting 325. The ports 321, 322, 323, 324, 325 are liquidly communicated. The inlets 321 and 322 are not lower than outlets 323 and 324 to ensure the self-circulating of the heated liquid.

A second fluid condensing and reclaiming apparatus 51 is connected at the fitting 325. FIG. 3-B is a schematic diagram illustrating the apparatus 51. The apparatus 51 is an airtight container. It has a top 511 and a bottom 512 and sidewall 513. An inlet pipe 52 having its one end extending upwardly from the bottom into the container and is mounted to the bottom 521 of the container. In FIG. 3-B, the inlet pipe 52 is a hollow bolt. Its opposite end 522 can be revolved directly into the breathing fitting at the top of the tank.

A flexural U-shaped pipe 53 (it may be pipe of other shapes, e.g. W-shaped etc.) extends its one end 531 from the sidewall of the container 51 into the container and under the tope wall 511. Its upper end is spaced from the top wall. The other parts including its lower part of the pipe are located outside of the tank. The pipe extends its opposite end downwardly first and then upwardly, so that the opposite end of pipe 53 is facing upwardly and its lower part 533 is located near the bottom of the container.

Referring to FIG. 4-B, an alternative fluid vapor condensing and reclaiming apparatus is illustrated. Not including U-shaped tube 63, other parts of this second embodiment are similar to apparatus 51 described above. The reference numbers in this drawing have been changed the first digital from 5 to 6. Otherwise the construction is similar to apparatus 51 described above.

A U-shaped tube 63 extends upwardly having one end 634 from the bottom 612 of the container 61 into the container and under the top wall 611. There is a gap between the end and the top wall. In FIG. 6, the apparatus provides the breathing for the liquid due to expansion and contraction. A small amount of condensed liquid is retained at the bottom part of the apparatus 61, which prevents further vapor from escaping into the atmosphere through the U-shaped tube 63.

The feature of the above mentioned container is to condense the liquid vapor in the container and let the condensed liquid return to the heater. Usually any inside wall of a container at a temperatures of less than 100 degrees Celsius can make the vapor condensing. Usually any metal, e.g. plastic, glass or polymeric material, can be used for making the container. When the system and environment temperature is high, in order to speed up the condensing processing, some condensing pieces may be installed in the container (not shown in FIGS. 3-B and 4-B). The flexural pipe 63 also needs to make the vapor condense in the tube. Furthermore, at the U shaped lower part of the pipe the condensed liquid can be stored temporary to block the escaping of the escaped vapor. The flexural pipe can be made of many different materials e.g. glass, metal, plastic, polymeric material etc. The shapes of the pipe are flexible, e.g. U shaped, W shaped or the like in which the bottom part of the pipe can store some condensed liquid.

Transparent pipes may be used to provide visible monitoring of the condensed liquid.

One of the main concerns for an operating heat driven self-circulating fluid heating and storage tank e.g. solar heating system is the fluid vaporizing and the vapor escaping through the breathing port. It may result in a failure of system operation. The application of the above introduced apparatus for fluid condensing and reclaiming resolves this problem completely. Usually the container of the apparatus is made of transparency materials, e.g. transparent glass, plastic or polymeric materials, thus the liquid level of the heat exchanger can be visually monitored, and the more liquid can be added through the breathing port if necessary.

There are two spare bolt caps for closing the unused inlet and outlet and one spare bolt cap for closing the unused breathing fitting. If necessary, all the breathing ports can be closed. In this case, the tank can be used as a regular tank with a heat exchanger or used with a self-power pump or electric pump.

FIG. 2-B illustrates another kind of fluid heating and storage tank, which is a hot water tank 40, as in FIG. 1-B. The fluid heating and storage tank 40 in FIG. 1-B is a water tank. It has a water container 401 comprising a cold water inlet 413 and a hot water outlet 412. At the top of the tank, there is a release valve 414 (it may at the sidewall too), a drain valve 416 and one electric power heater 415. Of course two electric power heaters can be added if necessary. The tank further includes the heat insulation layer 417 and a crust 418. On the sidewall 401 of the tank two inlets 421 and 422, two outlets 423 and 424 and a breathing fitting 425 are arranged.

FIG. 2 lists different components of the tank in details. They are not all necessary for the basic operation. For example, the crust may or may not be needed, if the heat insulation is ceramic. The number of the electric heater may be one, two or zero. The release valve can be installed on the top or sidewall of the tank.

A heat exchanger 430 is disposed within the fluid heating and storage tank 40 for flowing secondary fluid, which is a liquid through the storage tank in isolation from the water. Said heat exchanger has a first inlet, a first outlet, a second inlet and a second outlet for secondary fluid and at least one breathing port. Each of the ports (inlet, outlet and breathing ports) are mounted on one of relative to connective fittings, i.e. the first inlet fitting, the first outlet fitting, the second inlet fitting and the second outlet fitting and at least one breathing fitting to connect to said storage tank. The said two secondary fluid inlets are not lower than the two said outlets; and said breathing fitting is not lower than said inlet fittings.

Comparing to FIG. 1-B, the heat exchanger in FIG. 2-B can be separated into to liquidly isolating sub-system 4310 and 4320 by an isolation structure. This structure is a removable isolation plug 4309 located between tubes 4306 and 4307 and a second isolation plug 4308 located between tubes 4303 and 4304. The diameters at these two places are a little smaller than the diameters of the tubes. The two plugs are inserted through the ports 421 and 423. The plugs may also the pre-welded isolation caps. Here the sub-system 4310 is formed by across tubes 4303, 4306 and fin tube 4301. The sub-system 4302 is formed by across tubes 4304, 4307 fin tube 4302 and breathing pipe 4305.

A second fluid condensing and reclaiming apparatus 51 is connected at the fitting 126. FIG. 3-B is schematic diagram illustrating the apparatus 51.

The apparatus 51 is an airtight container. It has a top 511 and a bottom 512 and sidewall 513. An inlet pipe 52 has one end which extends upwardly from the bottom into the container and mounts on the bottom of the container. In FIG. 3-B, the inlet pipe 52 is a hollow bolt. Its opposite end 522 can be revolved directly into the breathing fitting at the top of the tank.

A flexural U-shaped pipe 53 (it may be in many other shape pipes, e.g. W-shaped etc.) extends its one end 531 from the sidewall of the container 51 into the container and under the tope wall 511. There is a gap between the end and the top wall. The other parts including its lower part of the pipe stay outside of the tank. The pipe extends its opposite end downwardly first and then upwardly. So that the opposite end of pipe 53 is facing upwardly and its lower part 533 is near to the bottom of the container.

Referring to FIG. 4-B, an alternative fluid vapor condensing and reclaiming apparatus is illustrated. Except U-shaped tube 63, other parts in FIG. 4 are the same as in FIG. 3-B. Each part's number differs by a leading digital 6 instead of 5. An U-shaped tube 63 extends upwardly its one end 634 from the bottom 612 of the container 61 into the container and under the tope wall 611. There is a gap between the end and the top wall.

The feature of above mentioned container is to condense the liquid vapor in the container and let the condensed liquid return to the heater. Usually any inside wall of a container at the temperature less than 100 degrees Celsius can make the vapor condensing. Usually any metal, plastic, glass or polymeric material can be used for the container material. When the system and environment temperature is high, to speed up the condensing processing, some condensing pieces may be installed in the container (not shown in the Figures). The flexural pipe 63 also needs to make the vapor condense in the pipe. Furthermore at the lower part 633 of the pipe 63 condensed liquid can be stored temporarily to block the escaping of the escaped vapor. The flexural pipe can be made of many different materials e.g. glass, metal, plastic, polymeric material etc. The shapes of the pipe are flexible, e.g. U shaped, W shaped or others, when the bottom part of the pipe is used to store some condensed liquid. Of course the transparent pipes are preferred.

FIG. 6-B is a schematic diagram illustrating the heat driven and self-circulated fluid heating and storage system employing a fluid heating and storage tank 40 with interior installed heat exchanger 430 and two solar heat collectors. Even both solar heat collectors in FIG. 6-B are plate solar heat collectors. Each of them can be any kind of the solar heat collector, for example, the plate solar heat collector (with or without the heat tube), Vacuumed tube solar heat collector (with or without the heat tube) and U-shaped solar heat collector etc.

The solar heat collector 760 in FIG. 6-B has a secondary fluid inlet 7611 and outlet 7612. The first conduit 762 is connected its one end to inlet 422 of the tank and an opposite end to the outlet 7611 of the solar heat collector 761. The one end of second conduit 763 is connected to the outlet of the tank and the opposite end 7632 to the inlet of solar heat collector 760. The solar heat collector 780 has similar connection arrangement.

Based on the application requirements, two couple inlet and outlet, 721/722 and 723/724 may be arranged at the sidewall in any angle from 90-180 degrees. When the heat driven self-circulated liquid heating system is used as building elements, for example as a unit element of the roof, fence, veranda etc, the units with two solar heat collectors arranged in 180 degrees are the plane unit of building walls, fences and verandas. The units with two solar heat collectors arranged at 90 degrees are the corner units.

As a building component unit, the heat driven self-circulated solar heating and storage system needs to be and can be a compacted component. In FIG. 6-B, when the solar heat collectors 780 and 760 are moved close to the fluid heating and storage tank while making the solar heat collector larger, a compacted solar heating and storage system can be made.

Similar to those shown in FIG. 5-B, each of the two couple of inlet/outlet ports is in a plumb line. However, the angle of the solar heat collector may be oriented to an obliquity (i.e. not 90 degrees) angle to the surface of the earth. Even if the inlet and outlet ports are in a plumb line, we still can adjust the arrangement of connecting conduits 762, 763, 782 and 783 to let the solar heat collector to be at an obliquity angle (not 90 degrees) to the surface of the earth for receiving a point-black amount of sun light. It is also possible to arrange the entire unit of the solar heat collector and the tank to stay at an oblique angle to the earth. In this case the tank is catty-cornered. To protect the tank from falling, the support of the system needs a special design.

After installation, the heat driven self-circulating solar heating and storage system 100 becomes two fluidly separated but heat connected liquid spaces. The first space is the interior space within tank 40 which may be filled with the liquid to be heated e.g. water, air or other fluids. The second space is the space formed by the heat exchanger 430, two conflux tubes 761 and 781 of the two solar heat collectors 760, 780, connecting conduits 762 763, 782, 783 and the inner space of the apparatus for fluid condensing and reclaiming 61. (the stoppers 4307 and 4308 are removed). This close-loop system connects to the atmosphere indirectly through the U-shaped tube 63. After the system is installed, the system will be filled with the heat conductive liquid, e.g. water or glycol etc. The liquid level in the tank will be lower than the breathing fitting.

When the sunlight irradiation heats the liquid in the solar heat collectors 760 and 780, the liquid in the conflux tubes 761 and 781 (within the heat insulation which is not shown in the Figure) is heated and tends to flow upwardly. The heated liquid flows through the connecting conduit 762 and 782 into the heat exchanger 430, and the heated liquid transfers its heat to the liquid in the tank. Then the liquid temperature drops and the volume of the liquid also drops too. Through the outlet 424 and the conduit pipe 763, the cooled liquid flows back into solar heat collector 760 again for being heated. This processing continues in circles to heat the water in the tank by the solar heater. In this process, the solar heat is the only energy source to drive the circulating liquid and to complete the energy exchange. Therefore, no other energy source, e.g. electric power, is required except the solar heat. In this process, when the sunlight is stronger, the heat circulation will be faster, whereas the heat circulating is slower, when the sunlight is weaker. When there is no sunlight, the heat circulating will terminate completely. It is not necessary to provide additional controller for controlling the liquid circulation. This head driven system has the functions of self-driven, self-control and self-circulating.

When the system is in operation, the breathing port 425 serves several important functions. First it releases the pressure in the system caused by the heated liquid expansion for keeping the system pressure closes to the atmospheric pressure. It also provides a space for the liquid's breathing (namely, expansion and contraction) so as to facilitate the self-circulating operation. When the heater is in operation, the heated liquid causes some liquid and vapor to flow into the container 51. The part of the vapor is cooled and condensed in the container 51, and then is returned to the heat exchanger. Some vapor may escape into the U-Shaped tube and then change into liquid, which will stay in the lower part of the tube. The gathered liquid in the tube blocks the further escape of vapor and would enhance further vapor to condense in the tube. When the heater stops working, the liquid in the container 51 and the heat exchanger cools down and contracts, so that the system generates a negative pressure to reclaim all the liquid gathered in the U-shaped tube to be drawn back into the heat exchanger. Even though the space storing the heat liquid is connected to the atmosphere directly or indirectly, the system working temperature is high, but the loss of the secondary liquid through vaporizing is not significant. Accordingly the system operates continuously and safely.

For the space limitation or other reasons, sometimes the solar heating system may be equipped with a single solar heat collector only. In this case, the solar heat collector 780 may be removed and the spare inlet and outlet ports 421 and 423 in Gig. 6 may be closed as 321 and 323 shown in FIG. 5-B. In another alternative, we can also replace the single solar heat collector by another type of heater operated with another energy source.

FIG. 7-B illustrates a heat driven self-circulated liquid heating and storage system 120 using a tank 40 with an interior installed heat exchanger 430. Comparing to FIG. 6-B, FIG. 7-B shows a solar heat collector 760 and another energy source heater that it is a fossil fuel (coal) heater 1200.

In FIG. 7-B, the tank 40, solar heat collector 760 and the connections between them are similar to those mentioned in FIG. 6-B. Here the coal heater 1200 comprises a central vacant cylinder (or other shaped e.g. taper, square etc) metal (or ceramic etc) tank 1201.

The tank 1201 further comprises an inner wall 1202 and an outer wall 1204. One metal coil tube 1203 located in the heat insulation material. One end of the tube 1203 is at the bottom of the tank 1201. The opposite end of the tube 1203 is at the upper part 1205 of the tank. The bottom of the heater is a hearth for coal burning in side. When the system is in operation, the coal burns in the hearth 1210 to heat the water tube 1203. The water in the tube is heated and expanded to move upwardly to the heat exchanger 430 through tube 1207. In the heat exchanger the water give up the heat and returns to the tube 1203 through outlet 424 and tube 1208 for heating again. The above-mentioned processing is continued in cycle and the water in the tank will be heated. The processing in this heating system is similar the processing of the solar heat collector system. A valve 1209 series connected to the tube 1207 for turning off the connection with heater when the heater 1200 is out of service. The same valve may be connected to the bottom conduit 1208 for the same reason.

For a heat driven self-circulating fluid heating and storage system with a solar heat collector and another energy source, its other parts have similar working processing that has been mentioned in the prior system with two solar heat collectors.

Even though the second heater shown in FIG. 7-B is a coal heater, it can also be any alternative kind of non-solar heaters, e.g. fossil fuel (e.g. coal) heater, nature gas heater, biomass energy heater, (including biomass gasification heater), earth energy and air energy heater etc. The advantage of this kind of the liquid heater is that the heating liquid storage space of this kind of heater is much smaller than any other kind of liquid heater. Because the solar heated water tank replaces the heat storage space that other energy water heater usually required. For example, one metal tube can be the storage container of the liquid to be heated in the heater. For the reason such as heat insulation and corrosion protection e.g. a firebrick or a ceramic protective layer may be provided. Further more, this heater can be a heater of earth or air heat energy. Since these kinds of heaters usually require forced circulation, so the heaters need a separator (e.g. separators 4308 and 4309 in FIG. 2-B) to separate the liquid into two sub-systems. In this case, only the sub-system connected to the solar heat collector has a breathing port. Another sub-system either has no breathing port or the port is closed with a spare cap.

FIG. 8-B illustrates the heat driven self-circulating fluid heating and storage system 140 with a heat appliance (radiator 970). The system includes a solar heater 760, a radiator 970 and a liquid heating and storage tank 30 with an interior installed heat exchanger 330. In FIG. 8-B, the tank 10 and radiator and their connections are same as the embodiment shown in FIG. 7-B. The radiator includes a fin pipe 771, which may alternatively be a coil tube, a helix tube, a straight tube or a flat heat exchanger etc. Two pipes connect inlet 773 and outlet 774 of the radiator to the inlet 123 and the outlet 124 of the tank respectively. Two valves 777 and 778 are for separating the radiator with the tank when necessary.

Solar heat collector 760 receives solar energy and transfers it to the tank 30, so the temperature in the tank is higher than the temperature of the surrounding air. When heated air is required, the valve 777 and 778 of the tank are opened, so that the hot water circulates into valve 777 and go through fin tube 771 to emit warm air there from. After the emission of warm air, the cold water then goes through valve 778 to return to the bottom of the tank 30. In order to increase the amount of heated air generating and to send the air to a planned direction, a cover 721 with an active window 770 may be provided. (as shown in FIG. 8, the window is opened upwardly). In fact the direction of the window can be varied. One or more fans (not shown in the drawings) may be provided in the cover to speed up the heat pervasion from the fin tube. (If a channel is added to the window of cover 721, the heated air can be transferred to a desire location (not shown in the figure).

It can be noted that the fitting 322 of the tank is an inlet when it is connected to a heater, but when it is connected to a radiator, it becomes an outlet, while the fitting 324 is an outlet when it is connected to a heater, it becomes an inlet when it is connected to a radiator.

It is also possible to install the radiator or other heat appliances in a heat driven self-circulated system with two solar heat collectors or with one solar heat and one other heat source. In this case, the fluid heating and storage tank need three pairs of the inlets and outlets.

Other aspects and features of present disclosure will become apparent to those ordinarily skilled in the art upon review of following description of specific embodiments of the invention in conjunction with the accompanying figures.

Referring to FIG. 1-C, an exemplary heat driven liquid close-loop automotive circulating system is illustrated during use. The system 9110 includes a heat collector 9111 having a vessel 9112 filled fully with heat transfer medium, which is a liquid 9113; said vessel having an inlet 9115 and an outlet 9114; said outlet 9114 is not lower than said inlet 9115.

A self-powered pump 9121 for heated liquid which used with a liquid heat collector 9111. The self-powered pump 9121 has an airtight container 91210 for containing heated liquid, having a wall to separate its outer and inner spaces. The inner space is filled with heated liquid partially, so that there is a upper air/vapor space 9127 above liquid level surface 9126 and lower liquid space 9125 under liquid level surface 9126. An inlet 9122 and a outlet 9123 arranged on said wall of the container that both are under the liquid level surface 9126 in said container, and the inlet 9122 is not lower than said outlet 9123.

A breathing channel 9124 mounted on said wall of said container 9121 for connecting to atmosphere with said inner upper air/vapor space 9127 above liquid level surface 9126; said breathing channel 9124 has a liquid vapor condensing and reflux structure that will be explained in FIG. 2-C and FIG. 3-C.

First conduit 9131 connects its one end 91311 at the outlet 9114 of the heat collector 9111. The opposite end of conduit 9131 connects at the inlet 9122 of the self-powered pump 9121. The inlet 9122 of self-powered pump 9121 is not lower than the outlet 9114 of said heat collector 9111. This is for the heat driven liquid move upwardly to the self-powered pump 9121.

Second conduit 9132 connects its one end 91321 at said outlet 9123 of said self-powered pump 9121 and its opposite end 91322 at said inlet 9115 of said heat collector 9121, The outlet 9123 of self-powered pump 9121 is not lower than the inlet 9115 of said heat collector 9111. FIG. 1-C shows that the second conduit 9132 has its top potion higher than the heat collector 9111 and the lower portion lower than the heat collector 9111 and its middle portion is as high as the level of the heat collector 9111 located.

In FIG. 1-C, the heat collector 9111, conduit 9131, self-powered pump 9121 and conduit 9132 are formed a heated liquid close-loop circuit. When the heat collector 111 received the heat, the heated liquid tends to move upwardly and the cooler liquid in the opposite direction. The heated liquid moves to the self-power pump 9121 and the cooler liquid in the bottom of heat collector 9111 and conduit 9132 comes and replenishes the space. So that a circulating power is generated in the system 9110 and make the system operation continuously when the heat is available.

This example circuit shows that by employing a self-powered pump at the upper place of the heat collector. It is possible to form a close loop circuit. In this circuit a heater can transfer its heat to the places whatever is higher, lower or the same level of the heater without external power pump.

Referring to FIG. 2-C, an exemplary a self-powered pump 9221 for heated liquid is illustrated during use. This pump includes an airtight container 92210 for containing heated liquid, having a wall 92211 to separate its outer and inner spaces; The inner space is filled with heated liquid partially and having a upper air/vapor space 9227 above liquid level surface 9226 and a lower liquid space 9225 under liquid level surface 9226.

an inlet 9222 and a outlet 9223 and 9229 or 9224 and 9260 are arranged on said wall 92211 of the container 92210 that both are under the liquid level surface 9226 in said container 92210, and said inlet 9222 not lower than said outlet 9223. A part 9224 of breathing channel is a connecting fitting mounted on said wall 92211 of said container 9221 for connecting atmosphere with the inner upper air/vapor space 9227 above liquid level surface 9226. The breathing channel having a liquid vapor condensing and reflux structure 9229 or 9260 is mounted on the fitting of 9224. The part 9229 is a "N" shape tube. When the liquid vapor from container 92210 may be condensed in the tube 9229 and the condensate may be temporary stored at the inner lower poison 92290. When the liquid in self-powered pump is cooled, the negative pressure may draw the condensate back to the container 92210, So that the liquid in the close-loop may be kept. This is also a channel to add the liquid to the close-loop circuit when the end 92292 of the tube 9229 is higher.

The liquid vapor condensing and reflux structure 260 is another kind of structure that mounted on the fitting of 9224. This is a transparent tube 9241 with a cup 9243. A hole 9224 on the wall of the tube 9241 is for connecting space 9227 with atmosphere. A set of vapor condensing pieces, e.g. copper pieces, are disposed in the breathing tube 9241 for liquid vapor condensing and condensate refluxing to the container.

Referring to FIG. 3-C, an exemplary another kind of breathing channel 9321 is illustrated during use. An airtight container 93210 for containing heated liquid, having a wall 93211 to separate its outer and inner spaces. The inner space is filled with heated liquid partially and having a upper air/vapor space 9327 above liquid level surface 9326 and lower liquid space 9325 under liquid level surface 9326. An inlet 322 and a outlet 9323 are arranged on said wall 93211 of the container 93210. They both are under the liquid level surface 9326. The inlet 9322 is not lower than outlet 9323.

A breathing channel 9324 mounted on said wall of said container for connecting atmosphere with said inner upper air/vapor space 9327 above liquid level surface 9326. The breathing channel has a liquid vapor condensing and reflux structure. It include a opening fitting 9324 on the wall under the liquid lever 326 in said container. A breathing tube 9329 mounted on said opening fitting 9324 under the liquid lever 9326 in said container and extended upwardly into the inner air/vapor space 9327 that upper the liquid level 9326 in said container. The breathing tube 9329 has a portion 93290 outside of said container wall and with a flexural shape, e.g. U shape It is for liquid vapor condensing and for condensate 93290 temporary storage and refluxing as explained in FIG. 2.

Referring to FIG. 4-C, an exemplary a heat driven liquid close-loop automotive circulating system is illustrated during use. This system includes a heat collector 9411, a liquid heating and storage tank 9431 and the connecting conduits 9451 and 9452. The heat collector 9411 combines two solar heat collectors 9412 and 9416. The heat collector has a liquid vessel 9412 filled fully with heat transfer medium, which is a liquid 9413. The vessel has an inlet 9415 and an outlet 9414. The outlet 9414 is not lower than said inlet 9415.

A liquid heating and storage tank 431is filled with heated liquid partially. In the tank has a heated liquid inlet 9432 and a heated liquid outlet 9433. Both of them are under the heated liquid level surface. The heated liquid inlet 432 is not lower than the heated liquid outlet 9433. a breathing channel 9437 mounted on the wall of said storage tank for connecting atmosphere with said inner upper air/vapor space above liquid level. The breathing channel has a liquid vapor condensing and reflux structure as explained in FIGS. 2-C and 3-C. First conduit 9451 connects its one end 94511 at the outlet 9414 of the heat collector 9411 and the opposite end 94512 at the inlet 9432 of the liquid heating and storage tank 9431. The inlet 9432 is not lower than the out let 9414 of the heat collector. Second conduit 9452 connects its one end 94521 at the outlet 9433 of said liquid heating and storage tank and the opposite end 94522 at the inlet 9415 of the heat collector. The outlet 9433 of said liquid heating and storage tank 9431 is not higher than the inlet 9415 of said heat collector 9411.

In FIG. 4-C, the heat collector 9411, conduit 9451, storage tank 9431 and conduit 9452 are formed a heated liquid close-loop circuit. When the solar heat collector 9411 received the solar heat, the heated liquid tends to move upwardly and the cooler liquid in the opposite direction. The heated liquid, it is water, moves to the storage tank 9431 and the cooler liquid in the bottom of heat collector 9411 and conduit 9452 comes and replenishes the space. So that a circulating power is generated in the system 9410 and make the system operate continuously when the heat is available.

In some case, a release valve that mounted at the fitting on the storage tank 9431 can replace the breathing channel 9437. In this case the storage tank 9431 becomes a pressured storage tank. The release valve may become a breathing channel. The heat transfer speed of this kind of pressured tank is not as good as an opened tank. Further more, there is a concern of the safety for frequent on/off release valve. One of the solutions is to add a release valve at the fitting 9434 at different start pressure setting value.

The storage tank has cool liquid inlet 436, hot liquid outlet 9435, drain 9439 and protective anode 9438 as normal tank.

Referring to FIG. 5-C, an exemplary a heat driven liquid close-loop automotive circulating system 9510 is illustrated during use. In this case, a solar heat collector is arranged in a place out of the building wall 9550 and the heat storage tank 9531 in seats in the room for freezing protection. A heat collector 9510 has its liquid vessel 9513 filled fully with heat transfer medium, which is a liquid. This liquid vessel 9513 has an inlet 9515 and an outlet 9514. The outlet 9514 is not lower than the inlet 9515.

A fluid heating and storage tank 9531 has a storage tank for primary fluid. The storage tank has a primary fluid, it is water, inlet 9536, a primary fluid outlet 9535, a secondary fluid inlet 9541 and a secondary fluid outlet 9542. The storage tank also has an apparatus 9540 disposed within the storage tank 9531 for flow a secondary fluid, which is a liquid, through the storage tank in isolation from the primary fluid, The apparatus fluidly interconnects the secondary fluid inlet 9532 with the secondary fluid outlet 9533 and comprising a heat exchanger 9540. The apparatus 9540 has a breathing channel extended upward and mounted at the top wall 95311 of the storage tank 9531. The breathing channel is fluidly communicated with the secondary fluid within apparatus and opened to atmosphere.

First conduit 9545 connects its one end at the outlet 95452 of a heat collector 9511 and the opposite end 95451 at the secondary fluid inlet 9532 of fluid heating and storage tank 9531. The secondary fluid inlet 9532 of said liquid heating and storage tank 9531 is not lower than the outlet of the heat collector 9511.

Second conduit 9546 connects its one end 95461 at said secondary fluid outlet 9533 of the fluid heating and storage tank 9531 and the opposite end 95462 at the inlet of the heat collector 9511. The secondary fluid outlet 9533 of the fluid heating and storage tank 9511 is not higher than the inlet 9515 of the solar heat collector.

In FIG. 5-C, the heat collector 9511, conduit 9545, the apparatus 9540 in the storage tank 9531 and conduit 9446 are formed a heated liquid close-loop circuit. When the solar heat collector 9511 receives the solar heat, the heated liquid tends to move upwardly and the cooler liquid in the opposite direction. The heated liquid moves to the apparatus 9540 in the storage tank 9531 and the cooler liquid in the bottom of heat collector 9511 and conduit 9546 comes and replenishes the space. So that a circulating power is generated in the system 9510 and make the system operate continuously when the heat is available. The apparatus (it is a fin tube in this example) transfer the heat in heated secondary liquid to primary fluid in the tank and the cooled secondary liquid returns to the solar hat collector. A heat transfer processing is completed. In this case, even the close-loop circuit is opened, but the primary fluid circuit is closed and pressured.

The storage tank 9531 has cool liquid inlet 9536, hot liquid outlet 9535, drain 9539 and protective anode 9538 as normal tank.

Referring to FIG. 6-C, an exemplary heat driven liquid close-loop automotive circulating system 9610 is illustrated during use. In this case a self-powered pump 9621 is used and the solar heat collector is installed in a roof 9651 of a building.

This system includes a solar heat collector 9611, a self-powered pump 9621 and a storage tank 9631 with a heat exchanger 9640 and connecting conduits.

The solar heat collector 9611 has a liquid vessel 9613 filled fully with heat transfer medium, which is a liquid. The liquid vessel 9613 has an inlet 9615 and an outlet 9614. The outlet 9614 is not lower than said inlet 9615.

The self-powered pump 9621 for heated liquid, has an airtight container 96210 for containing heated secondary fluid, which is a anti-freezing liquid. The pump 9621 has a wall to separate its outer and inner spaces. The inner space is filled with heated secondary liquid partially and has a upper air/vapor space 9627 above liquid level surface 626 and lower liquid space 9625 under liquid level surface 9626.

An inlet 9622 and a outlet 9623 are arranged on said wall of the container. Both inlet 9622 and outlet 9623 are under the secondary liquid level surface 9626 in said container 96210. The inlet 9622 is not lower than the outlet 9623. A breathing channel 9624 mounted on said wall of said container for connecting atmosphere with the inner upper air/vapor space 9627 above liquid level surface 9626. The breathing channel 9624 has a liquid vapor condensing and reflux structure that is not shown in this FIG. The detailed structure of the breathing channel has discussed in details in FIGS. 2-C and 3-C.

The fluid heating and storage tank 9631 has a storage tank 96312 for primary fluid. The storage tank 9631 has a primary fluid inlet 9636, a primary fluid outlet 9635, a secondary fluid inlet 9632 and a secondary fluid outlet 9633 and an apparatus 9640 disposed within the storage tank 9631 for flow a secondary fluid, which is a anti-free liquid, through the storage tank 9631 in isolation from said primary fluid. The apparatus 9640 fluidly interconnect the secondary fluid inlet 9632 with the secondary fluid outlet and comprising a heat exchanger; wherein said secondary fluid inlet 9632 of the fluid heating and storage tank is not lower than said secondary fluid outlet 9633 of said fluid heating and storage tank 9631.

First conduit 9648 connects its one end 96482 at the outlet 9614 of the heat collector 9611 and the opposite end 96481 at the secondary liquid inlet 9622 of said self-powered pump 9621. The outlet 9615 of the heat collector 9611 is not higher than the secondary fluid inlet 9622 of the self-powered pump 9621. Second conduit 9649 connects its one end 96451 at the secondary fluid outlet 9623 of the self-powered pump 9521 and the opposite end 96492 at said secondary fluid inlet 9632 of said fluid heating and storage tank 9631. The secondary fluid outlet 9623 of the self-powered pump 9621 is not lower than the secondary fluid inlet 9632 of the fluid heating and storage tank 9631. Third conduit 9647 connects its one end 96471 at the secondary fluid outlet 9633 of the fluid heating and storage tank 9631 and its opposite end 96472 at the inlet 9615 of the solar heat collector 9611. The secondary fluid outlet 9622 of the fluid heating and storage tank 9631 is not higher than the inlet 9615 of the heat collector 9611.

In FIG. 6-C, the heat collector 9611, conduit 9648, self-power pump 9621, conduit 9649, storage tank 9631 and conduit 9647 are formed a heated liquid close-loop circuit. When the solar heat collector 9611 received the solar heat, the heated liquid tends to move upwardly and the cooler liquid in the opposite direction. The heated liquid, it is water, moves to the storage tank 9631 and the cooler liquid in the bottom of heat collector 9611 and conduit 9647 comes and replenishes the space. So that a circulating power is generated in the system 9610 and make the system operate continuously when the heat is available.

Referring to FIG. 7-C, an exemplary a heat driven liquid close-loop automotive circulating system 9710 is illustrated during use. Comparing FIG. 7-C with FIG. 6-C, The difference is a building wall 97501 replaces the building roof 9651. In FIG. 6-C the heat receiver 9610 is higher than the storage tank 9631, but in FIG. 7-C, the heat receiver 9710 has the same height with the storage tank 9731. The tank 731 has electric heaters 9745 and 9746 that are the optional components did not show in every system.

It is easy to understand the system and how it works, if compare FIG. 7-C with FIG. 6-C. So that there is no more explanation is required.

Referring to FIG. 8-C, an exemplary heat driven liquid close-loop automotive circulating system 9810 is illustrated during use. This system includes a heat exchanger and without a heat storage tank. It is for the engineering case wherein the heat storage tank has no a internal installed heat exchanger.

This system includes a heat collector 9811, a self-powered pump 9821, a heat exchanger 9831 and connecting conduit 9861, 9862 and 9863.

A heat collector 9811 has a liquid vessel in the insulation and did not show in FIG. 8-C. The liquid vessel is filled fully with heat transfer medium, which is a anti-freezing liquid. The said liquid vessel has an inlet 615 and an outlet 9814. The outlet 9814 is not lower than the inlet 9815.

A self-powered pump 9621 is as discussed before. It has a breathing channel as discussed in FIG. 3-C.

A heat exchanger includes following components: A fluid reservoir 98310 is for primary fluid. The reservoir 98310 has a primary fluid inlet 9841, a primary fluid outlet 9842, a secondary fluid inlet 9832 and a secondary fluid outlet 9833. An apparatus 9840 is disposed within reservoir 98310 for flow a secondary fluid, which is a liquid, through the reservoir 98310 in isolation from the primary fluid. This apparatus fluidly interconnects secondary fluid inlet 9832 with said secondary fluid outlet 9833. The secondary fluid inlet 9841 of said heat exchanger 9831 is not lower than the secondary fluid outlet 9842 of the heat exchanger.

First conduit 9862, second conduit 9863 and third conduit 9861 connect the solar heat collector 9811, self-powered pump 9821 and the heat exchanger 9831 to form a heat driven close-loop liquid flow circuit. For the reasons mentioned in FIG. 6-C, there is a heat driven power to circulate the secondary liquid and transfer the heat from solar heat collector 9811 to the primary fluid within heat exchanger 9631.

From above discussions, we can find that there is a possibility to circulate the heated liquid in a close-loop circuit without external power and pump. The heat received in heat collector can be transferred to a place where is higher, lower or the sane height comparing with the location of the heat collector. In the thermal industry, especially in solar hot water industry above results are desired.

Other modifications will be apparent to those skilled in the art and, therefore, the invention is defined in the claims.

What is claimed is:

1. A heat driven self-circulating device to automatically circulate heated liquid to transfer heat without external pump power, comprises:
   an airtight container for containing a heated liquid and having a upper air/vapor space above a liquid level surface and a lower liquid space under liquid level surface;
   a first inlet, a first outlet, a second inlet and a second outlet of said heated liquid arranged on said airtight container wherein said first outlet is under the liquid level surface in said airtight container, and said first inlet is not lower than said first outlet; and
   a breathing channel having a liquid vapor condensing and refluxing structure connecting to atmosphere during operation.

2. The heat driven self-circulating device for the heated liquid according to claim 1, wherein said airtight container forms a part of a storage tank, further comprises:
   a primary fluid inlet;
   a primary fluid outlet;
   an apparatus, which is said airtight container, disposed within said storage tank for flow a secondary fluid, which is said heated liquid, through said storage tank in fluid isolation from said primary fluid, and said apparatus fluidly interconnecting said first inlet with said first outlet, and said second inlet with said second outlet thereby comprising a heat exchanger; and said breathing channel is in fluidly communicated with said heated liquid within said airtight container.

3. The heat driven self-circulating device for the heated liquid according to claim 2, wherein said heat exchanger further comprises an inner liquid separating mechanism separating said heat exchanger into a first sub-internal space and a second sub-internal space, wherein said first inlet and said first outlet are connected to said first sub-internal-space, and said heated liquid second inlet and said second outlet are connected to the second sub-internal-space.

4. The heat driven self-circulating device for the heated liquid according to claim 1, wherein said airtight container forms part of a two layer storage tank, and further comprises:
 a primary fluid inlet;
 a primary fluid outlet;
 a primary fluid chamber disposed within said airtight container for a primary fluid to receive heat transferred from a secondary fluid, which is said heated liquid, and in fluid isolation from said secondary fluid, comprising;
 a primary fluid chamber inlet fluidly communicated with said primary fluid inlet, and
 a primary fluid chamber outlet fluidly communicated with said primary fluid outlet;
 wherein said breathing channel is fluidly communicated with said secondary fluid.

5. The heat driven self-circulating device for the heated liquid according to claim 4, wherein said airtight container further comprises an separating mechanism for defining a first sub-space and a second sub-space in said airtight container, wherein said first sub-space connects to said first inlet and said first outlet, and said second sub-space connects to said second inlet and said second outlet.

6. The heat driven self-circulating device for the heated liquid according to claim 4, wherein said storage tank is selected from a group of:
 said storage tank having an interior sidewall and an outer sidewall;
 said storage tank having double layer bottom walls; and
 said storage tank having double layer sidewalls and double bottom walls.

7. The head driven self-circulating device according to claim 1, wherein said breathing channel comprising a fitting selected from a group of
 a breathing fitting mounted on said wall of said container, which is higher than said liquid level; and
 an breathing fitting mounted on the wall of said container under the liquid lever, a breathing tube having its one end mounted on said opening fitting, and a opposite end extended upwardly into the inner air/vapor space upper the liquid level in said container.

8. The heat driven self-circulating device according to claim 1, wherein said liquid vapour condensing and reclaiming structure is selected from a group of:
 a breathing fitting;
 a tube connected to said breathing channel,
 a tube having an lower tube end mounted on the breathing fitting of said container and a upper opposite tube end with a removable cup, a hall on the side wall of said tube for connecting atmosphere with said inner space upper liquid level in said container; a set of metal vapor condensing pieces disposed in said breathing tube for liquid vapor condensing and condensate refluxing;
 a flexural pipe having a flexural pipe first end mounted at the breathing fitting of the airtight container and a flexural pipe second end higher than the flexural pipe first end and the liquid surface level;
 an condensing airtight container for containing escaped heated liquid and vapor from said airtight container, said condensing airtight container having an inner tool for condensing the liquid vapour and a upper port open to atmosphere; a breathing pipe having a upper end extending upwardly into said airtight container and being mounted at the bottom of said condensing airtight container, and an opposite end connected to said breathing fitting at said airtight container; and
 an condensing airtight container for containing heated liquid vapor from said airtight container; a breathing pipe having a breathing pipe first end extending upwardly into said condensing airtight container and been mounted at the bottom of said airtight container, and an opposite end of breathing pipe connected to said breathing fitting of said airtight container; a flexural breathing and condensing pipe having one end extending upwardly into said condensing airtight container and located within the condensing airtight container being lower than the interior top side of said condensing airtight container, and an opposite end located outside of said condensing airtight container for condensing the escaped vapor and temporally storing the condensed liquid for reclaiming.

9. The heat driven self-circulating device, according to claim 1, further comprises a device selected from a group of:
 a backup bolt caps for closing said second inlet, said second outlet or said breathing channel when said fittings are not being used;
 a pressure release valve mounted on the breathing channel; and
 a pressure release valve with a piston, comprising: a spring, a piston and a outer covering.

10. A heat driven liquid self-circulating system, automatically circulating heated liquid to transfer heat to a place higher, lower or same high level of a heat collector without external pump power, comprises:
 a heat collector having a heat collector inlet and a heat collector outlet; wherein
  said heat collector outlet is not lower than said heat collector inlet; and
 a heat driven self-circulating device for said heated liquid, comprising:
  an airtight container for containing a heated liquid and having an upper air/vapor space above a liquid level surface and a lower liquid space under said liquid level surface;
  a first inlet, a first outlet, a second inlet and a second outlet of said heated liquid arranged on said airtight container, wherein said first outlet is under the liquid level surface in said airtight container, and said first inlet is not lower than said first outlet;
  a breathing channel having a liquid vapor condensing and refluxing structure connecting atmosphere with the upper air/vapour space;
  a first connecting conduit having a first conduit first end connecting to said heat collector outlet and n first conduit opposite end connecting to said first inlet, wherein said first inlet is not lower than the heat collector outlet.

11. The heat driven liquid self-circulating system according to claim 10, further comprising:
 a second conduit comprising:
  a second conduit first end connecting to said first outlet; and
  an second conduit opposite end connecting to said heat collector inlet, a cold liquid inlet; and
a hot liquid outlet.

12. The heat driven liquid self-circulating system according to claim 10, further comprising:
a second conduit comprising:
a second conduit first end connected to said first outlet and
a second conduit opposite end connected to said heat collector inlet; and
wherein said airtight container forms part of a storage tank, said storage tank comprising,
a primary fluid inlet; and
a primary fluid outlet;
an apparatus, which is said airtight container, disposed within said storage tank for flow a secondary fluid, which is said heated liquid, through said storage tank and in fluid isolation from a primary fluid, and said apparatus fluidly interconnecting said first inlet with said first outlet, thereby comprising a heat exchanger; and
said breathing channel fluidly communicated with said secondary fluid within said apparatus.

13. The heat driven liquid self-circulating system according to claim 12, further comprising:
a second connecting conduit having a second conduit first end connecting to said heat collector inlet, and a second conduit opposite end connecting to said first outlet,
a third connecting conduit having a third conduit first end connecting to said second inlet, and
a fourth connecting conduit having a fourth conduit first end connecting to said second outlet.

14. The heat driven liquid self-circulating system according to claim 10, further comprising:
a second conduit connecting a second conduit first end at said heated liquid outlet; and a second conduit opposite end at said inlet of said heat collector; and
wherein said airtight container forms part of a two layer storage tank, further comprises:
a primary fluid inlet;
a primary fluid outlet; and
a primary fluid chamber disposed within said airtight container for a primary fluid to receive heat transferred from a secondary fluid, which is said heated liquid, and in fluid isolation from said secondary fluid; comprising
a primary fluid chamber inlet fluidly communicated with said primary fluid inlet, and
a primary fluid chamber outlet fluidly communicated with said primary fluid outlet;
wherein said breathing channel is fluidly communicated with said secondary fluid.

15. The heat driven liquid self-circulating system according to claim 14, further comprising:
a second connecting conduit having a second conduit first end connecting to said heat collector inlet, and a second conduit opposite end connecting to said first outlet
a third connecting conduit having a third conduit first end connecting to said second inlet; and
a fourth connecting conduit having a fourth conduit first end connecting to said second.

16. The heat driven liquid self-circulating system according to claim 10, further comprising:
a second connecting conduit having a second conduit first end connecting to said heat collector inlet, and a second conduit opposite end connecting to said first outlet;
a third connecting conduit having a third conduit first end connecting to said second inlet; and a fourth connecting conduit having a fourth conduit first end connecting to said second outlet;
wherein said heat driven self-circulation device further comprising:
a primary fluid inlet;
a primary fluid outlet;
a primary fluid chamber disposed within said airtight container for a primary fluid to receive heat transferred from a secondary fluid, which is said heated liquid, and in fluid isolation from said secondary fluid;
said primary fluid chamber having a primary fluid chamber inlet fluidly communicated with said primary fluid inlet, and a primary fluid chamber outlet fluidly communicated with said primary fluid outlet;
wherein said breathing channel fluidly communicated with said secondary fluid.

17. The heat driven self-circulating system according to claim 10, wherein said heat driven self-circulating device forms part of a storage tank, and said system further comprises a device selected from a group of:
a second heat collector having a second heat collector inlet and a second heat collector outlet; or
a heat appliance having a heated liquid inlet and a heated liquid outlet.

18. The heat driven self-circulating system according to claim 10, further comprises
a self-powered pump.

19. The heat driven self-circulating system according to claim 10, further comprises:
a fluid heating and storage tank, comprising:
a storage tank inlet; and
a storage tank outlet,
wherein said storage tank inlet is not lower than the storage tank outlet;
a first conduit connecting a first conduit first end at said heat collector outlet and a first conduit opposite end at said first inlet, wherein said heat collector outlet is not higher than said first inlet;
second conduit connecting a second conduit first end at said first outlet and a second conduit opposite end at said storage tank inlet, wherein said first outlet is not lower than said storage tank inlet; and
a third conduit connecting third conduit first end at said storage tank outlet, and a third conduit opposite end at said heat collector inlet,
wherein said fluid heating and storage tank is selected from a group of:
a fluid heating and storage tank;
a fluid heating and storage tank with a heat exchanger which fluidly communicated the storage tank inlet and the storage tank outlet; and
a double layer fluid heating and storage tank.

20. The heat driven self-circulating system according to claim 10, wherein said air container further comprising:
a secondary fluid inlet;
a secondary fluid outlet;
an apparatus disposed within said airtight container for flow a secondary fluid, which is said heated liquid through said air container in fluid isolation from said primary fluid, said apparatus fluidly interconnecting said secondary fluid inlet with said secondary fluid outlet; thereby comprising a heat exchanger; wherein said secondary fluid inlet is not lower than said secondary fluid outlet;
a first conduit connecting a first conduit first end at said heat collector outlet and a first conduit opposite end at said secondary liquid inlet, wherein said heat collector outlet is not higher than said secondary fluid inlet;
a second conduit connecting a second conduit first end at said secondary fluid outlet and a second conduit opposite end at said heat collector inlet;
wherein said breathing channel is fluidly communicated with said heated liquid.

21. The heat driven self-circulating system according to claim 10, wherein said heat collector is selected from a group of
a solar heat collector, and
a heater using another energy source, which is selected from a group of fossil fuel, biomes, nature gas, earth heat, air heat and electricity.

22. The heat driven self-circulating system according to claim 10, wherein said breathing channel comprising a fitting selected from a group of
a breathing fitting mounted on said wall of said container, which is higher than said liquid level; and
an breathing fitting mounted on the wall of said container under the liquid lever, a breathing tube having its one end mounted on said opening fitting, and a opposite end extended upwardly into the inner air/vapor space upper the liquid level in said container.

23. The heat driven self-circulating system according to claim 10, wherein said liquid vapour condensing and reclaiming structure is selected from a group of:
a breathing fitting;
a tube connected to said breathing channel;
a tube having an lower tube end mounted on the breathing fitting of said container and an upper opposite tube end with a removable cup, a hall on the side wall of said tube for connecting atmosphere with said inner space upper liquid level in said container; a set of metal vapor condensing pieces disposed in said breathing tube for liquid vapor condensing and condensate refluxing;
a flexural pipe having a flexural pipe first end mounted at the breathing fitting of the airtight container and a flexural pipe second end higher than said flexural first end and the liquid surface level;
a condensing airtight container for containing escaped heated liquid and vapor from said airtight container, said condensing airtight container having a inner tool for condensing the liquid vapour and a upper port open to atmosphere; a breathing pipe having a upper end extending upwardly into said airtight container and being mounted at the bottom of said condensing airtight container, and an opposite end connected to said breathing fitting at said airtight container; and
an condensing airtight container for containing heated liquid vapor from said airtight container; a breathing pipe having one end extending upwardly into said condensing airtight container and been mounted at the bottom of said airtight container, and an opposite end of breathing pipe connected to said breathing fitting of said airtight container; a flexural breathing and condensing pipe having one end extending upwardly into said condensing airtight container and located within the condensing airtight container being lower than the interior top side of said condensing airtight container, and an opposite end located outside of said condensing airtight container for condensing the escaped vapor and temporally storing the condensed liquid for reclaiming.

24. The heat driven self-circulating system according to claim 10, further comprises a device selected from a group of:
backup bolt caps for closing said heated liquid second inlet, said heated liquid second outlet or said breathing channel when said fittings are not being used;
a pressure release valve mounted on the breathing channel; and
a pressure release valve with a piston, comprising: a spring, a piston and a outer covering.

25. The heat driven self-circulating system according to claim 10, wherein said liquid comprises a liquid selected from a group of:
water and an anti-freezing liquid.

* * * * *